US007693208B2

(12) United States Patent
Marsili et al.

(10) Patent No.: US 7,693,208 B2
(45) Date of Patent: Apr. 6, 2010

(54) METHOD AND CIRCUIT FOR LIMITING THE POWER OF A SIGNAL COMPILED FROM SPREAD-CODED SIGNALS

(75) Inventors: Stefano Marsili, Fürnitz (AT); Dietmar Sträussnigg, Villach (AT)

(73) Assignee: Infineon Technologies AG, Neubiberg (DE)

( * ) Notice: Subject to any disclaimer, the term of this patent is extended or adjusted under 35 U.S.C. 154(b) by 1276 days.

(21) Appl. No.: 11/175,716

(22) Filed: Jul. 6, 2005

(65) Prior Publication Data

US 2006/0013288 A1 Jan. 19, 2006

(30) Foreign Application Priority Data

Jul. 6, 2004 (DE) .................. 10 2004 032 666

(51) Int. Cl.
*H04B 1/00* (2006.01)
(52) U.S. Cl. .................. 375/140; 375/130; 375/297; 375/295; 375/219; 455/73
(58) Field of Classification Search .......... 375/140, 375/130, 297, 295, 219; 455/73
See application file for complete search history.

(56) References Cited

U.S. PATENT DOCUMENTS

| 5,991,262 | A | 11/1999 | Laird et al. ............ 370/209 |
| 6,459,723 | B1 * | 10/2002 | Kim et al. ............ 375/146 |
| 7,313,114 | B2 * | 12/2007 | Karjalainen ............ 370/335 |
| 7,346,038 | B2 * | 3/2008 | Yang et al. ............ 370/335 |
| 7,379,489 | B2 * | 5/2008 | Zuniga et al. ............ 375/130 |
| 2004/0014436 | A1 * | 1/2004 | Lipka et al. ............ 455/112 |
| 2004/0109492 | A1 * | 6/2004 | Viero et al. ............ 375/130 |
| 2005/0243895 | A1 * | 11/2005 | Ashikhmin et al. ....... 375/146 |

FOREIGN PATENT DOCUMENTS

WO 02/101954 A1 12/2002

OTHER PUBLICATIONS

3GPP Standard TS 25.213 v5.3.0; Technical Specification Group Radio Access Network; Spreading and Modulation (FDD) (Release 5) (28 pages), Mar. 2003.
3GPP Standard TS 25.104 v6.2.0; Technical Specification Group Radio Access Network; Base Station (BS) Radio Transmission and Reception (FDD) (Release 6) (59 pages), Jun. 2003.
3GPP Standard TS 25.141 v6.2.0; Technical Specification Group Radio Access Network; Base Station (BS) Conformance Testing (FDD) (Release 6) (159 pages), Jun. 2003.
Olli Väänänen, "Reducing the Crest Factor of a CDMA Downlink Signal by Adding Unused Channelization Codes," IEEE Commincations Letters, vol. 6, Nov. 10, 3 pages, 2002.

* cited by examiner

*Primary Examiner*—David C Payne
*Assistant Examiner*—Zewdu Kassa
(74) *Attorney, Agent, or Firm*—Dicke, Billig & Czaja, PLLC

(57) ABSTRACT

The method is used for limiting the power of a transmission-end signal ($x_n$) compiled from a plurality of differently spread-coded signals. In this context, it is assumed that the quantity of spread codes used for the differently spread-coded signals is known as code engagement information ($C_{ch,SF,k}$; 80). First, correction spread codes are selected by virtue of the engagement information ($C_{ch,SF,k}$; 80) being evaluated. On the basis of the selected correction codes, a spread-coded correction signal ($y'_n$) is formed which is overlaid with the compiled signal ($x_n$).

26 Claims, 22 Drawing Sheets

SF=2　SF=4　SF=8　SF=16　SF=32　SF=64 · · ·

METHOD AND CIRCUIT FOR LIMITING THE POWER OF A SIGNAL COMPILED FROM SPREAD-CODED SIGNALS

CROSS REFERENCE TO RELATED APPLICATION

This application claims priority to German Patent Application No. 10 2004 032 666.5, which was filed on Jul. 6, 2004, and is incorporated herein by reference in its entirety.

TECHNICAL FIELD

The invention relates to a method for limiting the power of a transmission-end signal compiled from a plurality of differently spread-coded signals and to an appropriate circuit.

BACKGROUND

In third-generation W-CDMA-based systems (Wideband Code Division Multiple Access), such as UMTS, subscribers are separated by using subscriber-specific spread codes. In this case, each symbol in a subscriber-specific data sequence is multiplied by the spread code. The elements of the resultant sequence are called chips. Each subscriber-specific physical transmission channel is in this case allocated a dedicated spread code, also called channelization code. The subscriber-specific physical channels are each spread using a channelization code. For a UMTS system, the generation of the transmission signal in the downlink, i.e. from the base station to the mobile stations, is described in the UMTS-standard document 3GPP TS 25.213 V5.3.0.

The channelization codes are "OVSF (Orthogonal Variable Spreading Factor) spread codes". These are described in the UMTS-standard document 3GPP TS 25.213 V5.3.0 under Section 4.3. The various OVSF spread codes are orthogonal with respect to one another and can have various code lengths and various spread factors. The OVSF spread codes are selected from an OVSF code tree. This has a plurality of levels, whose associated OVSF spread codes are characterized by the same spread factor. Each OVSF spread code with a spread factor n is followed in the OVSF code tree by two mutually orthogonal OVSF spread codes with the spread factor 2n, but these codes are not longer orthogonal with respect to the OVSF spread code with the spread factor n. To ensure the orthogonality of the spread-coded signals, only particular OVSF spread codes are therefore permitted to be selected from the OVSF code tree: as soon as an OVSF spread code from the OVSF code tree with a particular spread factor is already being used, all spread codes with a higher spread factor which follow this OVSF spread code in the OVSF code tree are no longer permitted to be used.

After the individual physical channels have been spread, the resultant channels have a chip rate of 3.84 MHz. Next, the spread signals are coded with a scrambling code, and the chip rate remains the same. Generally, this involves the same scrambling code being used in a base station for all channels. Following subsequent power scaling, the individual channels are overlaid through addition to form a total signal. Alternatively, instead of the separate coding of the individual channels with the scrambling code, it is also possible to code the overlaid total signal with the scrambling code. In addition, the total signal is overlaid with subscriber-independent synchronization channels. The resultant complex signal is then subjected to pulse shaping and is then up-converted to the carrier-frequency band. After that, the signal is fed into a linear-operation power amplifier and is then radiated via the antenna.

The power of the total signal coded with the scrambling code has a wide dynamic range. Typically, the dynamic range is approximately 10 dB.

Such a wide dynamic range has a negative effect particularly on the power amplifier, in which linear operation needs to be ensured over the entire dynamic range. This therefore needs to be designed to be of corresponding size.

Patent Specification U.S. Pat. No. 5,991,262 discloses a technical doctrine whose aim is to reduce the dynamic range of the input signal for the power amplifier in a CDMA-based system. In this context, the power of a signal compiled from a plurality of differently spread-coded signals is limited through overlaying with a correction signal. Spreading is not performed using OVSF spread codes in this case, but rather using "Walsh codes" with a constant spread factor. The correction signal is formed by first producing a provisional correction signal from the compiled signal. Walsh code-domain transformation of the compiled signal is used to ascertain the quantity of orthogonal spread codes which are already being used. With knowledge of the spread codes which are already being used for the compiled signal, it is possible to remove from the provisional correction signal those signal components which are based on spread codes which are already being used. There thus remain only the signal components which are based on spread codes which are not yet being used. The resultant correction signal is then overlaid with the compiled signal, so that the signal power of the resultant signal is limited.

Laid-Open Specification WO 02/101954 A1, which forms the closest prior art, describes a similarly operating solution for limiting the power in a W-CDMA system. The spread codes underlying both the compiled signal and the correction signal are the aforementioned OVSF spread codes. Instead of through Walsh code-domain transformation, the quantity of OVSF spread codes which are already being used is ascertained by means of OVSF code-domain transformation. The OVSF code-domain transformation takes place for a particular spread factor $SF_{min}$.

A drawback of the solution described is that the correction signal is formed by using OVSF spread codes with the spread factor $SF_{min}$, the spread factor $SF_{min}$ corresponding to the smallest spread factor for the spread codes used in the compiled signal. If, by way of example, the compiled signal contains a data channel at a high data rate which requires a spread factor of 8, then $SF_{min}=8$ and there thus remain a maximum of 7 OVSF spread codes for producing the correction signal. If the compiled signal additionally also contains further data channels at a low data rate, i.e. with a high spread factor, some or even all of the 7 remaining OVSF spread codes are eliminated as free OVSF spread codes during OVSF code-domain transformation with the spread factor $SF_{min}$, of the compiled signal. If all OVSF spread codes with the spread factor $SF_{min}$ are eliminated as free OVSF spread codes, it is not possible to generate a correction signal which is orthogonal with respect to the compiled signal.

In addition, the prior art takes account neither of the influence of the coding with the scrambling code nor of the influence of a transmission-end pulse-shaping filter or of the two synchronization channels. Furthermore, the technical doctrine known from the prior art can be applied only when just one scrambling code is used in a base station; the use of different scrambling codes is thus not taken into account.

SUMMARY

It is therefore an object of the invention to specify a method for limiting the power of a transmission-end signal compiled from a plurality of differently spread-coded signals which is improved in respect of the drawbacks described above. It is also an aim of the invention to specify an appropriate circuit.

The object underlying the invention can be achieved by a method for limiting the power of a transmission-end signal compiled from a plurality of differently spread-coded signals, the spread codes used for the differently spread-coded signals being known as code engagement information, the method comprising the steps of:
a) selecting correction spread codes by evaluating the engagement information;
b) forming a spread-coded correction signal on the basis of the selected correction spread codes; and
c) overlaying the compiled signal with the correction signal formed.

The object can also be achieved by a method for limiting the power of a transmission-end signal compiled from a plurality of differently spread-coded signals in a W-CDMA radio device, said signal being coded with a scrambling code, the method comprising the steps of:
a) forming a spread-coded correction signal from the compiled signal on the basis of correction spread codes, and
b) overlaying the compiled signal with the correction signal formed.

The object can also be achieved by a method for limiting the power of a transmission-end signal compiled from a plurality of differently spread-coded signals in a W-CDMA radio device, said signal not yet being coded with a scrambling code, the method comprising the steps of:
a) forming a correction signal on the basis of correction spread codes, and
b) overlaying the compiled signal with the correction signal formed, wherein step a) comprises the following step:
a1) coding the compiled signal with the scrambling code associated with the compiled signal.

The object can also be achieved by a method for limiting the power of a transmission-end signal compiled from a plurality of differently spread-coded signals, the method comprising the steps of:
a) forming a correction signal on the basis of correction spread codes, and
b) overlaying the compiled signal with the correction signal formed, wherein step a) comprises the following step:
digital filtering
of the compiled signal or
of a signal which is dependent on the compiled signal
in line with the signal shaping of one or more digital, analogue or mixed-signal signal processing stages which are used for the further processing of the compiled signal after the scrambling operation.

The object can also be achieved by a method for limiting the power of a transmission-end second signal compiled from M first signals coded with different scrambling codes, where each first signal is a signal compiled from a plurality of differently spread-coded signals, the method comprising the steps of:
a) forming a spread-coded correction signal on the basis of correction spread codes, and
b) overlaying the second signal with the correction signal formed, wherein step a) comprises the following steps:
a1) forming a first provisional correction signal on the basis of the second signal;
a2) producing P second provisional correction signals from the first provisional correction signal, where $P \leqq M$;
a3) respectively decoding the P second provisional correction signals with P of the M inverted scrambling codes;
a4) selecting those signal components of the P decoded second provisional correction signals which are based on the correction spread codes; and
a5) forming the correction signal on the basis of the selected signal components.

The object can also be achieved by a circuit for limiting the power of a transmission-end signal compiled from a plurality of differently spread-coded signals, the spread codes used for the differently spread-coded signals being known as code engagement information, comprising:
a first means for selecting correction spread codes by evaluating the engagement information,
a second means for forming a spread-coded correction signal on the basis of the selected correction spread codes, and
a third means for overlaying the compiled signal with the correction signal formed.

The object can also be achieved by a circuit for limiting the power of a transmission-end signal compiled from a plurality of differently spread-coded signals in a W-CDMA radio device, said signal being coded with a scrambling code, comprising:
a first means for forming a spread-coded correction signal from the compiled signal on the basis of correction spread codes, and
a second means for overlaying the compiled signal with the correction signal formed.

The object can also be achieved by a circuit for limiting the power of a transmission-end signal compiled from a plurality of differently spread-coded signals in a W-CDMA radio device, said signal not yet being coded with a scrambling code, comprising:
a first means for forming a spread-coded correction signal on the basis of correction spread codes, and
a second means for overlaying the compiled signal with the correction signal formed, where the first means comprises:
a means for coding the compiled signal with the scrambling code associated with the compiled signal.

The object can also be achieved by a circuit for limiting the power of a transmission-end signal compiled from a plurality of differently spread-coded signals, comprising:
a first means for forming a spread-coded correction signal on the basis of correction spread codes, and
a second means for overlaying the compiled signal with the correction signal formed, wherein the first means comprises:
a digital means for filtering
the compiled signal or
a signal which is dependent on the compiled signal in line with the signal shaping of one or more digital, analogue or mixed-signal signal processing stages which are used for the further processing of the compiled signal after the scrambling operation.

The object can also be achieved by a circuit for limiting the power of a transmission-end second signal compiled from M first signals coded with different scrambling codes, where each first signal is a signal compiled from a plurality of differently spread-coded signals, comprising:
a first means for forming a spread-coded correction signal on the basis of correction spread codes, and a second means for overlaying the second signal with the correction signal formed, wherein the first means comprises:
a means for forming a first provisional correction signal on the basis of the second signal,
a means for producing P second provisional correction signals from the first provisional correction signal, where P≦M,
a means for decoding the P second provisional correction signals with P of the inverted M scrambling codes,
a means for selecting those signal components of the P decoded second provisional correction signals which are based on the correction spread codes, and
a means for forming the correction signal on the basis of the selected signal components.

The method in line with one aspect of the invention is used to limit the power of a transmission-end signal compiled from a plurality of differently spread-coded signals. In this context, it is presupposed that the quantity of spread codes used for the differently spread-coded signals is known as code engagement information. The inventive method is divided into three steps: in a first step, correction spread codes are selected by virtue of the engagement information being evaluated. On the basis of the selected correction spread codes, a spread-coded correction signal is formed. The correction signal formed is then overlaid with the compiled signal, so that the power of the resultant signal is limited.

In the prior art, free spread codes used as correction spread codes for forming the correction signal are identified by virtue of code-domain transformation of the compiled signal being performed. By contrast, in line with one aspect of the invention, the code engagement information is used to select the correction codes. The code engagement information is generally present in a base station, since the knowledge about the codes which are already being used is required in order to ensure that the subscriber-specific channels are orthogonal. In this case, the code engagement information is generally available in the form of a table which indicates for each spread code whether or not said spread code is used for spread-coding a subscriber-specific channel. The inventive method thus ascertains the free spread codes with little complexity in comparison with the prior art.

It is advantageous if each of the correction spread codes has the same spread factor $SF_{corr}$. In this case, the spread codes which are being used and the correction spread codes are advantageously OVSF spread codes. Under this assumption, the method permits the spread factor $SF_{corr}$ to be greater than or equal to the smallest spread factor $SF_{min}$ of the spread codes which are being used.

In the closest prior art, the common spread factor $SF_{corr}$ of the correction spread codes is chosen to be equal to the smallest spread factor $SF_{min}$ of the spread codes which are being used for the compiled signal. If the invention determines the correction spread codes by evaluating the code engagement information, there is no restriction to the spread factor $SF_{corr}$ being selected to be no greater than $SF_{min}$. By virtue of the invention allowing the common spread factor $SF_{corr}$ of the correction spread codes also to be selected to be greater than $SF_{min}$ and the number of OVSF spread codes increasing as the spread factor increases, there are thus potentially more correction spread codes available. If a multiplicity of OVSF spread codes with the spread factor $SF_{corr}$ are thus eliminated as free-OVSF spread codes, then the increased number of OVSF spread codes with the spread factor $SF_{corr}$ means that it is generally still possible to generate a correction signal which is orthogonal with respect to the compiled signal. The inventive method thus allows more efficient utilization of the free OVSF spread codes for generating the correction signal.

The code engagement table is advantageously evaluated in the form that a spread code with the spread factor $SF_{corr}$ is fundamentally not a correction spread code if this spread code is a spread code which is being used or one of the spread codes with $SF > SF_{corr}$ which follow this spread code in the OVSF code tree is a spread code which is being used. A similar situation applies if one of the spread codes with $SF < SF_{corr}$ which precede this spread code in the OVSF code tree is a spread code which is being used.

Advantageously, the selection of the correction spread codes is updated whenever the quantity of spread codes which are being used changes. This is the case when a subscriber-specific channel is removed from the compiled signal or a new channel is added to the compiled signal.

It is advantageous if the correction spread codes are also selected on the basis of first power statements which are each characteristic of the power of a spread-coded signal in the compiled signal. Since the transmission system can tolerate up to a certain degree of not all correction spread codes being orthogonal with respect to the codes which are being used, it is also possible for the correction spread codes used to be spread codes which, in accordance with the evaluation specification above, are fundamentally not suitable as correction spread codes. To minimize the influence of a non-orthogonal correction code on the transmission properties, the invention proposes taking into account the aforementioned first power statements of the various spread-coded signals. If a spread code is already being used for a channel, then this spread code tends to be more readily able to be used as a correction spread code as well if the power of the associated channel is as high as possible. In this case, the interfering influence by the correction signal on this channel is small.

In this context, it is advantageous if one or more spread codes with the spread factor $SF_{corr}$ have second power statements determined for it/them which are each characteristic of the power of a signal component of the compiled signal which (signal component) is associated with a spread code with the spread factor $SF_{corr}$. This measure takes account of the idea that even if an OVSF spread code is not being used directly to spread a channel it nevertheless has a power component during code-domain transformation of the compiled signal if a code which follows or precedes in the OVSF code tree is being used. In line with the invention, this power component is determined for one or more spread codes with the spread factor $SF_{corr}$.

Preferably, the method involves a provisional correction signal being formed before the actual correction signal on the basis of the compiled signal. In this case, the provisional correction signal is based on arbitrary spread codes and not just on the correction spread codes. In addition, code-domain transformation of the provisional correction signal is performed for the spread codes with the spread factor $SF_{corr}$. A spread code with the spread factor $SF_{corr}$ is imperatively selected as correction spread code if the absolute-value square for the spread code's allocated coefficient of the code-domain transformation of the provisional correction signal satisfies the following condition: said absolute-value square must be less than a particular fraction of the second power statement of the same spread code. In this case, the interfering influence on account of lack of orthogonality of the spread codes is small.

The inventive selection of the correction spread codes is advantageously made such that correction spread codes which are orthogonal with respect to the spread codes which are being used are ascertained exclusively from the engagement information. The remaining spread codes with the spread factor $SF_{corr}$, which are not orthogonal with respect to the spread codes which are being used, are selected as correction spread codes when the above condition is satisfied for the second power statement.

In the case of a method (operating in accordance with the second aspect of the invention) for limiting the power of a signal compiled from a plurality of differently spread-coded signals in a W-CDMA radio device, a spread-coded correction signal based on correction spread codes is formed first of all. It is of fundamental importance to this method that the compiled signal is already coded with a scrambling code. The correction signal formed is then overlaid with the compiled signal.

If the compiled signal is—as proposed—already coded with the scrambling code, the influence of the scrambling operation is taken into account when generating the correction signal.

In accordance with one advantageous embodiment, the correction signal is formed by first forming a provisional correction signal from the compiled signal. In this case, the provisional correction signal is based on arbitrary spread codes. The provisional correction signal is then decoded with the inverted scrambling code. Next, those signal components of the decoded provisional correction signal which are based on the correction spread codes are selected. The selected signal components are then coded with the scrambling code. The correction signal is then formed on the basis of the signal components coded with the scrambling code.

By virtue of the provisional correction signal being decoded with the inverted scrambling code—as described above—it firstly becomes possible to select the signal components which are based on the correction spread codes. This can advantageously be done by means of code-domain transformation. Without appropriate decoding, the provisional correction signal cannot be broken down into individual signal components which are each based on different spread codes. It should be remembered that despite the decoding with the inverted scrambling code the influence of the scrambling operation continues to be taken into account, since it is not the compiled signal but rather the provisional correction signal which is decoded with the inverted scrambling code.

Advantageously, the method is used in a W-CDMA-based base station, and the compiled signal additionally comprises the data of the synchronization channels. In this case, not only the scrambling operation but also the influence of the synchronization channels are taken into account when generating the correction signal.

In an alternative method (operating in line with the second aspect of the invention) for limiting the power of a transmission-end signal compiled from a plurality of differently spread-coded signals in a W-CDMA radio device, the compiled signal is not yet coded with a scrambling code. In a first step, a spread-coded correction signal is formed on the basis of correction spread codes. In this case, the compiled signal is coded with the scrambling code associated with the compiled signal. In a second step, the compiled signal is overlaid with the correction signal.

If the compiled signal is not yet coded with the scrambling code, the invention provides for the influence of the scrambling operation, which actually does not take place until later in the signal flow, nevertheless to be already taken into account during generation of the correction signal by virtue of the formation of the correction signal being based on a signal which is obtained by coding the compiled signal with the scrambling code.

In accordance with one advantageous embodiment, the correction signal is formed by first forming a provisional correction signal from the compiled signal coded with the scrambling code. Next, the provisional correction signal is decoded with the inverted scrambling code. Those signal components of the decoded provisional correction signal which are based on the correction spread codes are then selected. Finally, the correction signal is formed on the basis of the selected signal components. In this case too, the influence of the scrambling operation continues to be taken into account despite the decoding with the inverted scrambling code.

A method operating in line with a third aspect of the invention is used to limit the power of a signal compiled from a plurality of differently spread-coded signals. First, a spread-coded correction signal is formed on the basis of correction spread codes. The correction signal formed is then overlaid with the compiled signal. A fundamental feature of this method is that when forming the spread-coded correction signal either the compiled signal or a signal which is dependent on the compiled signal is digitally filtered. In this case, the filtering is performed with the signal shaping of one or more digitally, analogue or mixed-signal signal processing stages which are used for the further processing of the compiled signal after the scrambling operation. Suitable signal processing stages are, in particular, the transmission-end pulse-shaping filter (analogue or digital), the digital/analogue converter before the up-conversion to the carrier-frequency band, the mixer and other filters for further processing of the compiled signal. In this case, the filtering may also concern just one subaspect of the aforementioned signal processing stages, for example the sample-and-hold effect of a digital/analogue converter and the analogue low-pass filter (reconstruction filter) at the output of the digital/analogue converter. By contrast, the filtering may also take place in line with the entire chain of signal processing stages up to the input of the power amplifier.

One advantage of the method described above is that the influence of the signal processing stages, which are actually arranged not until afterwards in the signal flow, is nevertheless already taken into account beforehand during generation of the correction signal. The behaviour of the transmitter at a downstream point is thus predicted and is compensated for beforehand.

It is advantageous if the filtering is performed at a sampling rate which is increased in comparison with the sampling rate of the compiled signal. The reason for this is that the digital signal processing stages for further processing of the compiled signal generally already operate at an increased sampling rate. The analogue and mixed-signal signal processing stages fundamentally produce signal components which are above the chip rate. If the signal shaping of one or more digital, analogue or mixed-signal signal processing stages needs to be simulated as precisely as possible, then the compiled signal needs to be filtered at an increased sampling rate.

A method operating in line with the fourth aspect of the invention is used for limiting the power of a transmission-end second signal compiled from M first signals coded with different scrambling codes. In this case, each first signal is a signal compiled from a plurality of differently spread-coded signals. The method is divided up as follows: first, a spread-coded correction signal is formed on the basis of correction spread codes. To this end, a first provisional correction signal is formed on the basis of the second signal. Next, P second provisional correction signals are produced from the first provisional correction signal, where $P \leq M$. The P second provisional correction signals are then respectively decoded with P of the M inverted scrambling codes. Next, those signal components of the P decoded second provisional correction signals which are based on the correction spread codes are selected. The correction signal is then formed on the basis of the selected signal components. To this end, the selected signal components are each first of all also coded with the corresponding scrambling code. The correction signal formed is then overlaid with the compiled signal, so that the power of the resultant signal is limited.

The inventive method thus makes it possible to limit the power of a compiled signal which is based on a plurality of scrambling codes. The P second provisional correction signals are advantageously produced from the first provisional correction signal in the form that the first correction signal is split over the P second provisional correction signals. In this case, the split can be made on the basis of various criteria. It is conceivable to split the first correction signal into equal parts. Alternatively, the first correction signal may also be split proportionally to the RMS (Roof Mean Square) value of the first signal or to the mean of the absolute value of the first signals.

Within the context of the application, the various aspects of the invention can also be combined. Thus, by way of example, the selection of the correction codes in line with the first aspect of the invention can also be used in the methods in line with the second to fourth aspects of the invention.

The statements made above regarding the inventive methods also apply in appropriate sense to the various inventive circuits for limiting the power of a compiled signal.

BRIEF DESCRIPTION OF THE DRAWINGS

The invention is explained in more detail below using a plurality of exemplary embodiments with reference to the drawings, in which.

DETAILED DESCRIPTION

Figure 1:
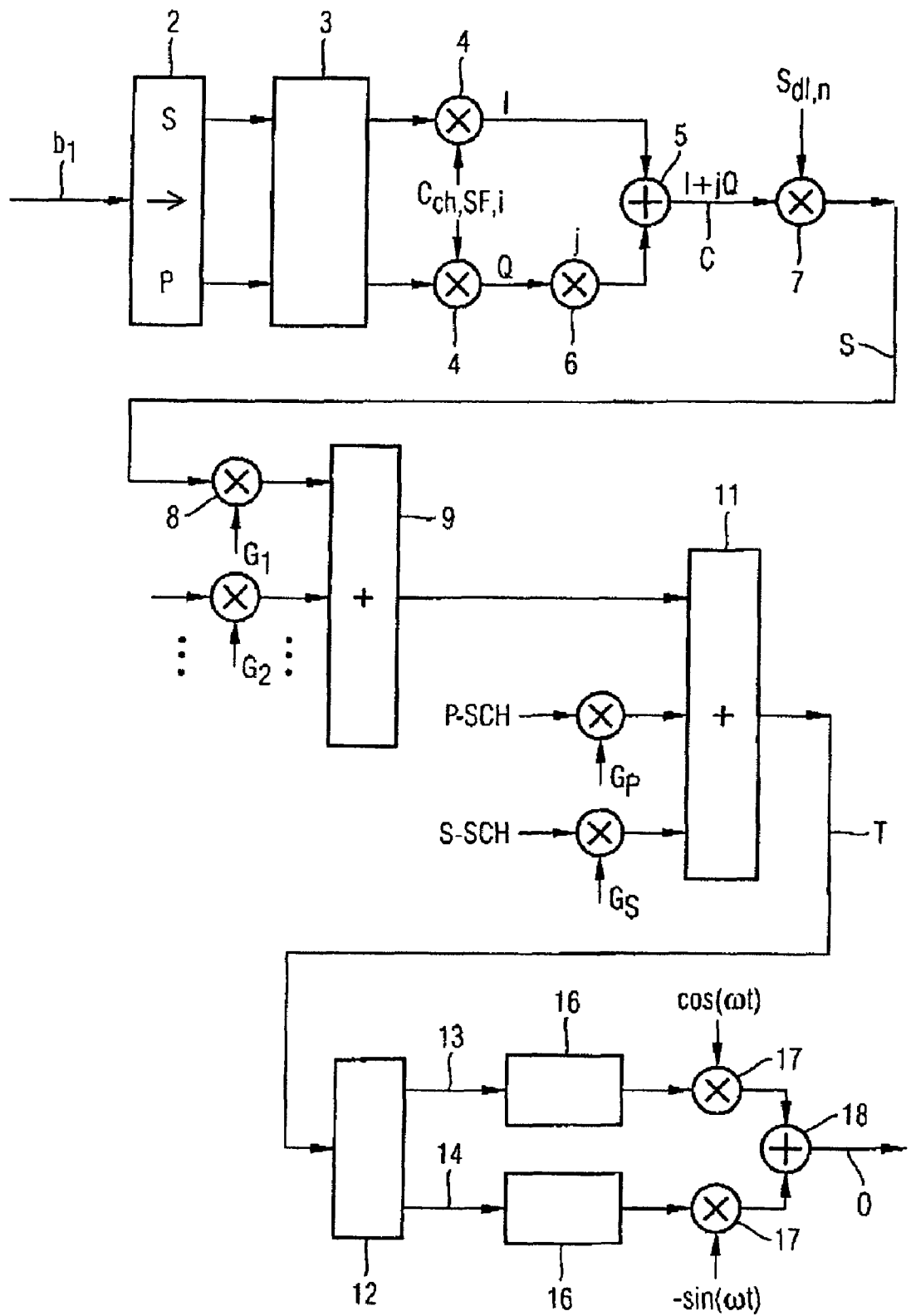
FIG. 1 shows an illustration of a circuit arrangement for spread coding and modulation in a UMTS base station.

FIG. 1 shows a circuit arrangement for spread coding and modulation in a W-CDMA-based UMTS base station. The illustration tends towards the UMTS-standard document 3GPP TS 25.213 V5.3.0. The text below first describes the spread coding and the coding with the scrambling code using a physical channel from a plurality of channels processed in parallel. A serial data signal $b_1$ from a physical channel at a particular data rate is converted into a parallel signal based on two bit streams in a unit 2. The two bit streams are then mapped onto the I and Q paths by a mapping unit 3 in accordance with the type of modulation, for example QPSK (Quadrature Phase Shift Keying) or 16-QAM (Quadrature Amplitude Modulation). The resultant complex signal is spread with a complex channelization code $C_{ch,SF,k}$ using two multipliers 4. Each physical channel is allocated a dedicated channelization code $C_{ch,SF,k}$. The channelization codes $C_{ch,SF,k}$ are OVSF spread codes.

After channel spreading, each channel has a chip rate of 3.84 MHz. The two spread data streams are converted into a complex data stream I+jQ by means of an adder 5 and a phase shifter 6. The complex data stream I+jQ is coded at point C with the scrambling code $S_{dl,n}$ which is also called scrambling. In this context, the signal is multiplied by the complex code sequence of the scrambling code $S_{dl,n}$ using a multiplier 7. The UMTS standard allows different scrambling codes $S_{dl,n}$ to be used for various physical channels. However, just one scrambling code $S_{dl,n}$ is typically used in a transmission unit in a base station in order to obtain the orthogonality for the channelization codes to the greatest extent.

Following the complex-value scrambling at point S, the channel is scaled to an associated power value by multiplication by a scaling value $G_1$ using a multiplier 8. The scaled signals of various physical channels are overlaid using an adder 9. The resultant signal compiled from a plurality of differently spread-coded signals is then overlaid with the scaled synchronization channels P-SCH (Primary Synchronization Channel) and S-SCH (Secondary Synchronization Channel) using an adder 11. The resultant complex signal at point T is split into the real and imaginary parts 13 and 14 by means of a unit 12. The two data streams have a chip rate of 3.84 MHz in this context. Each of the signals 13 and 14 is supplied to a pulse-shaping filter 16, the pulse-shaping filters 16 being in the form of square-root raised cosine filters with a roll-off factor of 22%. In this case, the filters operate at a sampling rate which is increased in comparison with the chip rate. Next, the filter signals are up-converted to the carrier-frequency band using a mixer 17.

The real and imaginary parts are then added by an adder 18. The signal which results at the output 0 of FIG. 1 is fed into a power amplifier (not shown) which amplifies the radio-frequency signal and delivers it to an antenna (not shown).

The compiled signal coded with the scrambling code at point T is obtained from overlaying a plurality of complex random signals, with the amplitude of the total signal having a normal distribution. The power of the total signal therefore has a wide dynamic range. The further processing of the compiled signal, which follows point T, can expand the dynamic range even further.

Figure 2:
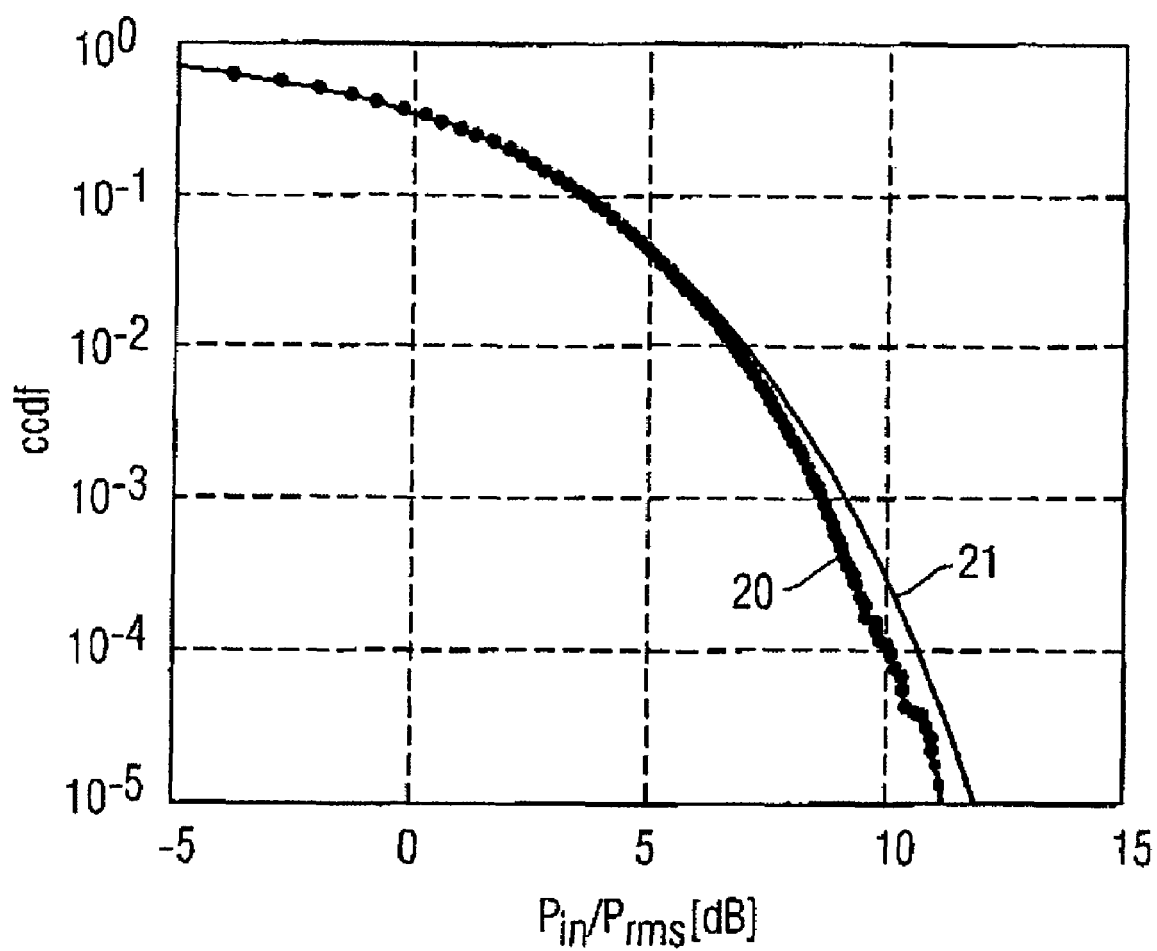
FIG. 2 shows an illustration of the profile of the complementary cumulative distribution function ccdf.

FIG. 2 shows the profile of the complementary cumulative distribution function ccdf for the W-CDMA signals at point T (curve 20) and at point 0 (curve 21). In this case, the value of the function ccdf on the Y-axis describes the probability that the ratio of the instantaneous power $P_{in}$ to the average power $P_{rms}$ of the signal in question is higher than the ratio plotted on the X-axis. The dynamic range of a signal is in this case defined as the ratio of the instantaneous power $P_{in}$ to the average power $P_{rms}$ of the signal in question, in which the function ccdf has the value $10^{-4}$. The dynamic range of the compiled signal at point T is approximately 10 dB, while the dynamic range at point 0 is approximately 11 dB.

A dynamic range of such magnitude has a particularly negative effect on the power amplifier. To prevent nonlinearity effects such as mixing to other frequency bands, it is necessary for the compression point of the power amplifier to be at least 10 dB above the maximum input power. However, this means that the power amplifier is significantly over-proportioned in relation to the average input power. This has an associated increased power consumption, an associated low power efficiency and an associated increased complexity for providing the supply voltage and for cooling the power amplifier. These drawbacks are associated with additional costs for the operator of a base station.

Figure 3:
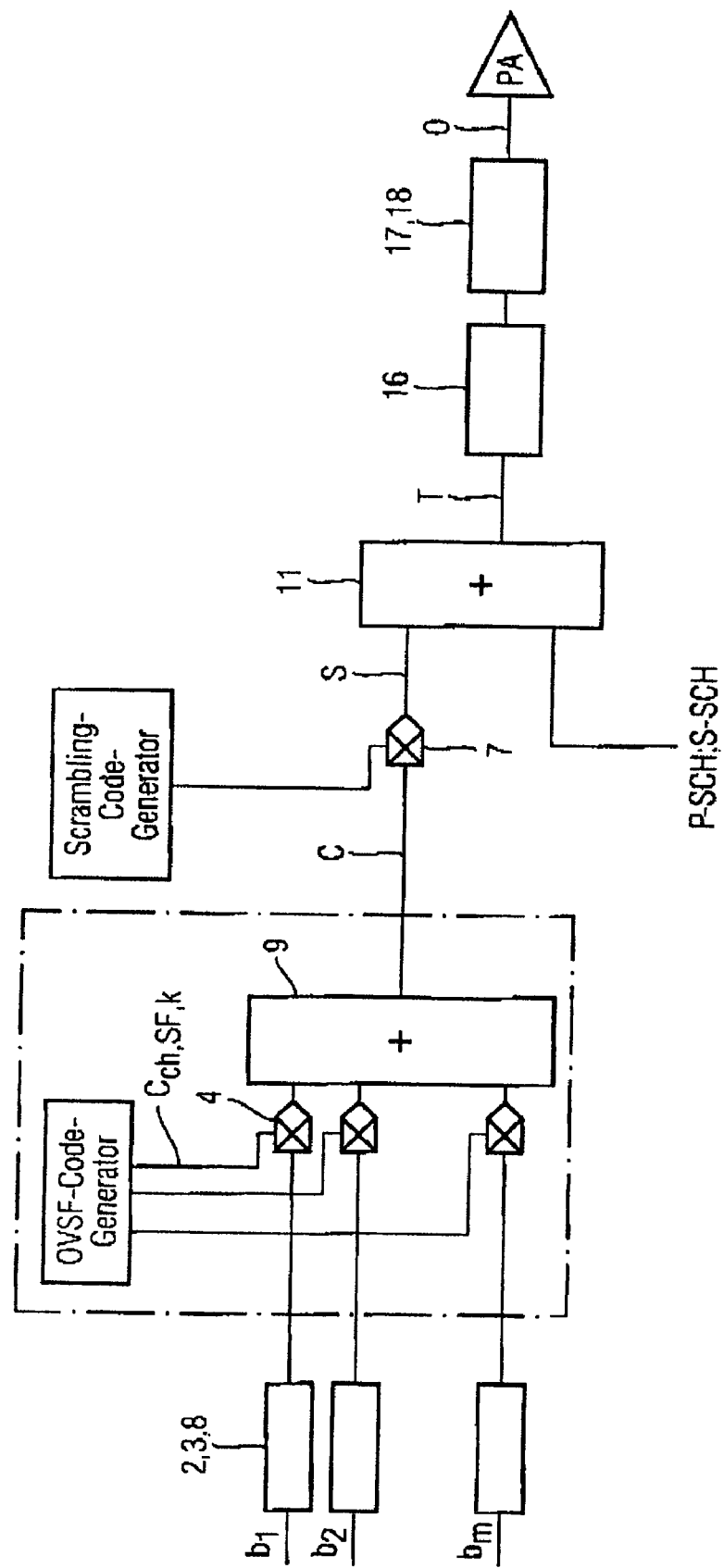
FIG. 3 shows an illustration of an alternative circuit arrangement (to FIG. 1) for spread coding and modulation in a UMTS base station.

As an alternative to the circuit arrangement shown in FIG. 1 for spread coding and modulation, said circuit may also be designed in accordance with FIG. 3. Components and signals from FIG. 1 and FIG. 3 which are provided with the same reference symbols correspond to one another. A fundamental difference between the circuit arrangements shown in FIG. 1 and FIG. 3 is that in FIG. 3 the individual channels are first spread separately with the appropriate spread code $C_{ch,SF,k}$ and are then overlaid to form a compiled signal. Next, the compiled signal is coded with the scrambling code at point C. There is thus no separate scrambling of the individual channels in FIG. 3 as in FIG. 1. The statements below relate to the circuit arrangement shown in FIG. 3; these can generally also be transferred to the circuit arrangement shown in FIG. 1, however.

Each physical channel is spread with a different OVSF spread code $C_{ch,SF,k}$, all of the spread codes being orthogonal with respect to one another. In this case, each spread code $C_{ch,SF,k}$ comprises a real sequence of the values +1 or −1. The length SF of such a sequence is a power of 2. The length SF corresponds to the spread factor. The spread factor SF of the OVSF spread code $C_{ch,SF,k}$ used for a physical channel is dependent on the symbol rate of the physical channel. The higher the symbol rate, the smaller the spread factor SF of the corresponding spread code $C_{ch,SF,k}$. After the channel spreading, each physical channel has the same chip rate, namely 3.84 MHz, which means that the individual channels can be overlaid in the adder 9.

Figure 4:
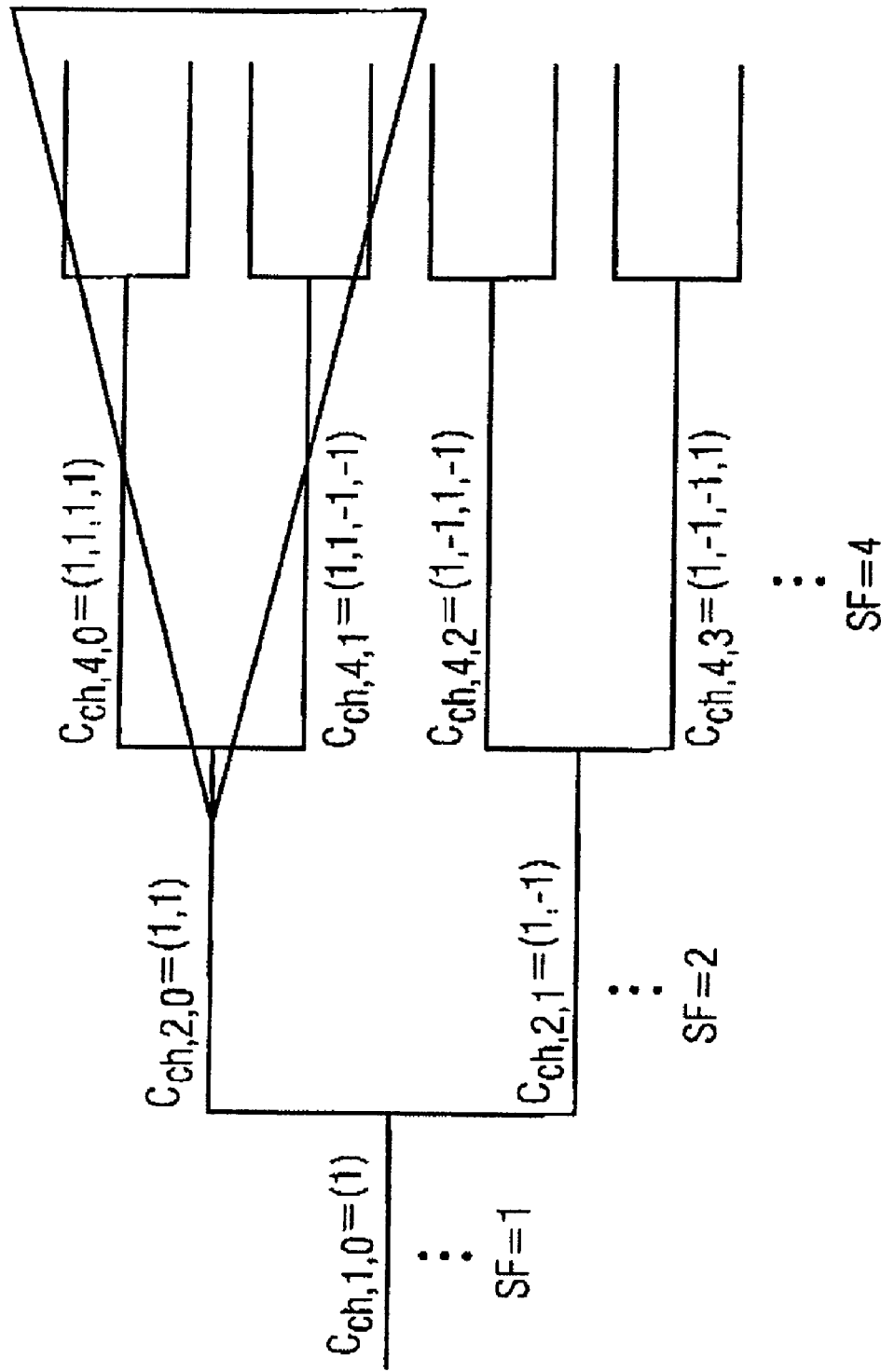
FIG. 4 shows an illustration of an OVSF code tree.

FIG. 4 shows an OVSF code tree from which the individual OVSF spread codes $C_{ch,SF,k}$ are derived. This code tree has a plurality of levels, whose associated OVSF spread codes are characterized by the same spread factor. Each OVSF spread code with a spread factor SF=n is followed in the OVSF code tree by two mutually orthogonal OVSF spread codes with the spread factor SF=2n, but these are no longer orthogonal with respect to the OVSF spread code with respect to n. To ensure the orthogonality of the spread-coded signals, only particular OVSF spread codes may be selected from the OVSF code tree: as soon as an OVSF spread code from the OVSF code tree with a particular spread factor is already being used, all spread codes with a higher spread factor which follow this OVSF spread code in the OVSF code tree may no longer be used. If, by way of example, the spread code $C_{ch,2,0}$ with the spread factor SF=2 is being used, the subsequent spread codes, such as the spread codes $C_{ch,4,0}$, $C_{ch,4,1}$ with the spread factor SF=4 and the spread codes $C_{ch,8,0}$ to $C_{ch,8,3}$ with the spread factor SF=8, can no longer be used. The decision regarding which spread codes are used is made on higher OSI layers and is communicated to the OVSF code generator.

Figure 5:
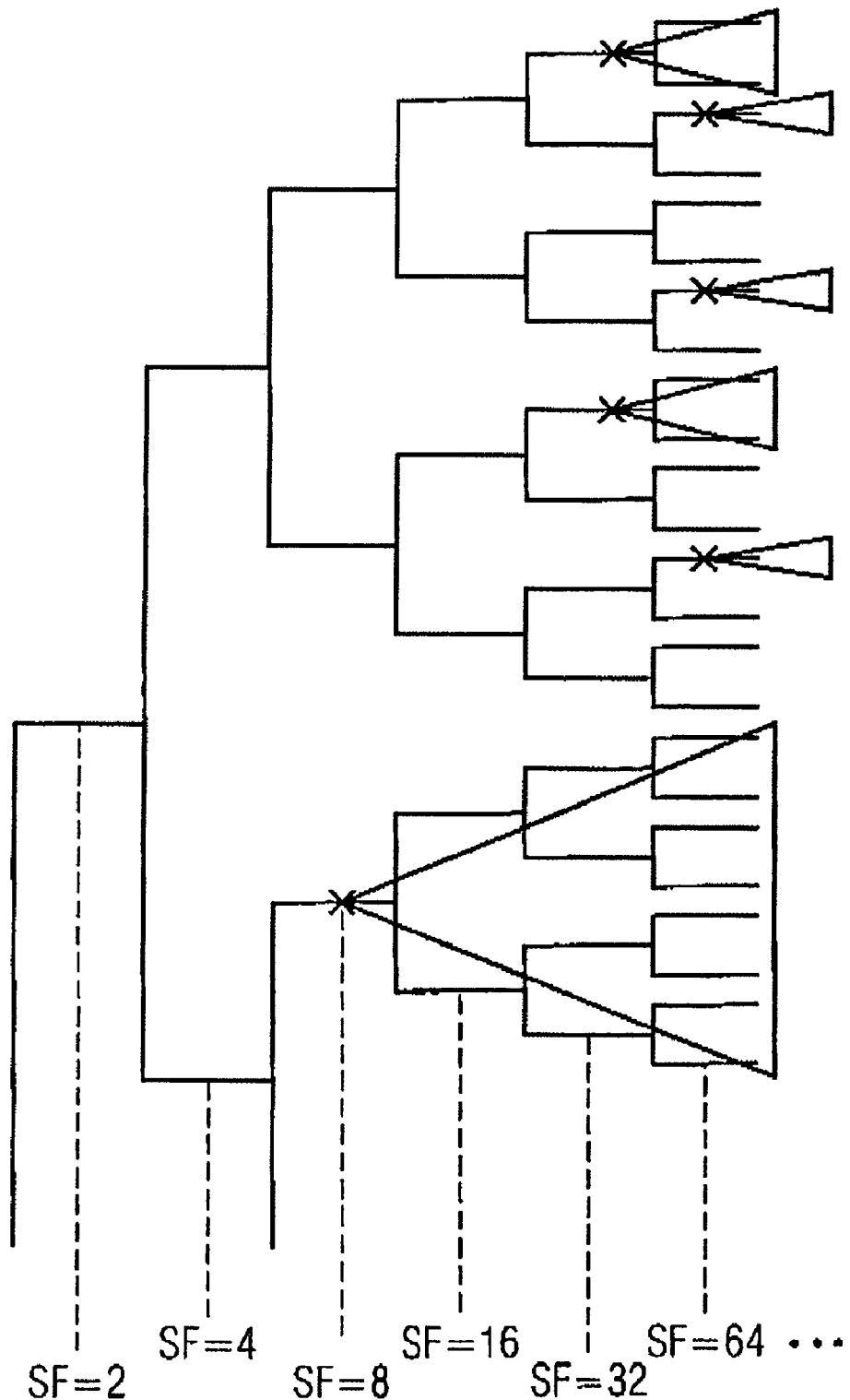
FIG. 5 shows an illustration of a detail from an OVSF code tree with the illustrative use of a plurality of OVSF spread codes.

FIG. 5 shows an exemplary use of a plurality of OVSF spread codes in an OVSF code tree. In this case, a plurality of OVSF spread codes with various spread factors are used for the various physical channels. The spread codes being used are each marked with a cross in FIG. 5. The respective spread codes with a higher spread factor which follow the OVSF spread codes being used in the OVSF code tree may no longer be used to ensure orthogonality. This has been expressed graphically by the triangles which are shown. Only the remaining OVSF spread codes are free spread codes and can be used for spread coding additional channels.

In Laid-Open Specification WO 02/101954 A1, which forms the closest prior art, the power of a signal compiled from a plurality of differently spread-coded signals is limited such that a correction signal is formed which is based only on correction spread codes. The correction spread codes form a subset of the free spread codes. Such a correction signal, upon being overlaid with the compiled signal, limits the power of the resultant signal and does not interfere with the transmission of the physical channels, since the correction spread codes are orthogonal with respect to the spread codes which are being used. To form the correction signal, OVSF correction spread codes with an identical spread factor $SF_{min}$ are used, the spread factor $SF_{min}$ corresponding to the smallest spread factor of the spread codes which are being used for the compiled signal.

Figure 6:
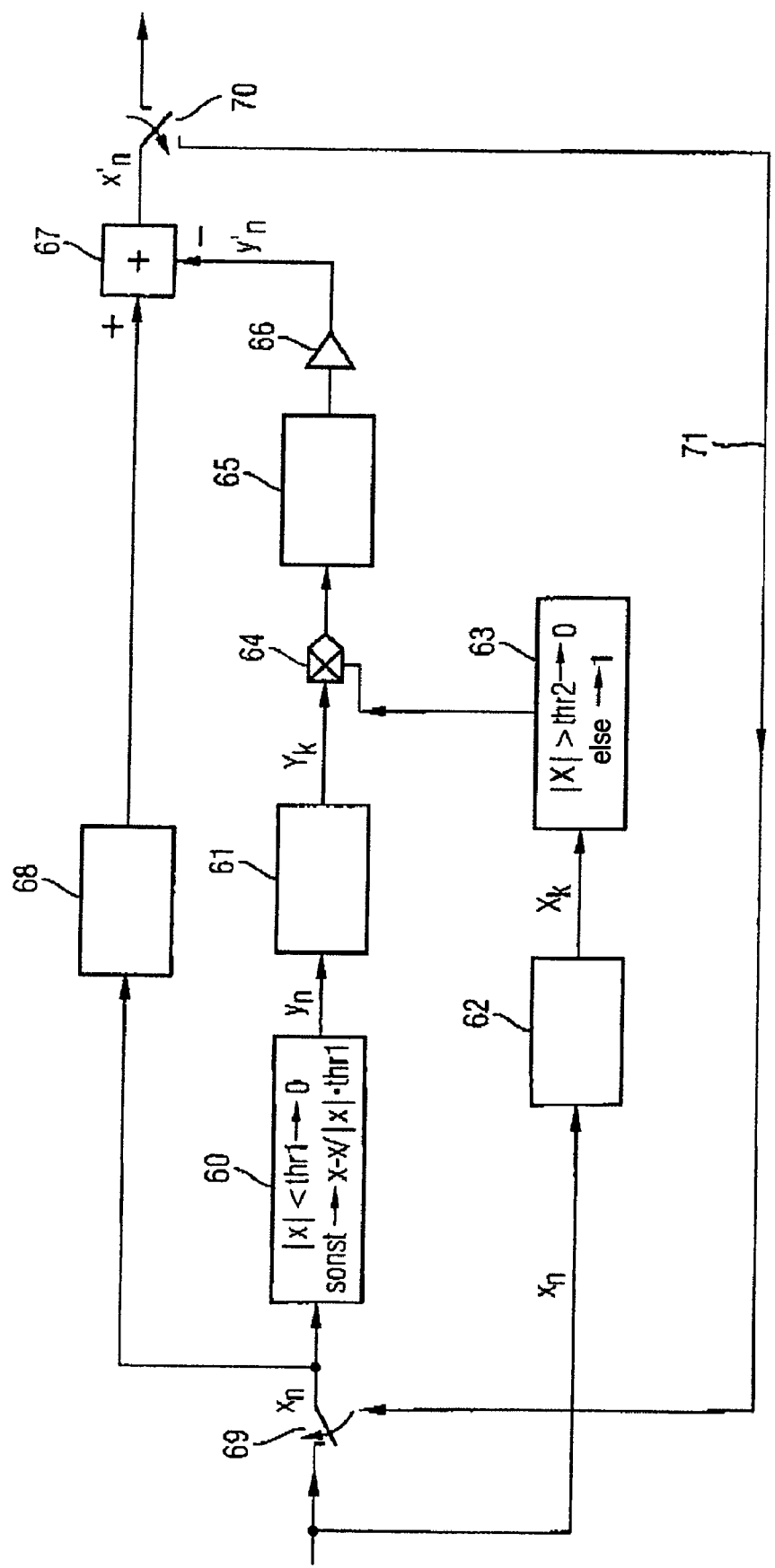
FIG. 6 shows an illustration of a circuit arrangement for power limiting in accordance with the prior art.

The circuit arrangement shown in FIG. 6 elucidates the principle for limiting the power of a compiled W-CDMA signal which is known from Laid-Open Specification WO 02/101954 A1. The compiled signal $x_n$ at point C (see FIG. 3), i.e. before scrambling, is divided into individual blocks with $SF_{min}$ chips. Each block is processed as shown in FIG. 6. The processor 60 first checks whether the block of length $SF_{min}$ contains at least one chip with an amplitude which is greater than a first threshold value thr1. If this is the case, the unit 60 forms a provisional correction signal $y_n$ in accordance with the relationship $$y_n = x_n - x_n / |x_n| \cdot thr1 \quad (1)$$

with $SF_{min}$ chips. Alternatively, the amplitude of the provisional correction signal $y_n$ is determined to be zero. The provisional correction signal $y_n$ and the input signal $x_n$ are each supplied to a unit 61 or 62 for carrying out code-domain transformation. Code-domain transformation for the codes $C_{ch,SF_{min},k}(n)$ with the spread factor $SF_{min}$ can be described by the following equation:

$$X_k = \sum_{n=0}^{SF_{min}-1} x_n \cdot C_{ch,SF_{min},k}(n). \qquad (2)$$

In this case, the variable $x_n$ describes the chips of the signal of length $SF_{min}$ which is to be transformed, and the variable $C_{ch,SF_{min},k}(n)$ describes the chips of the spread code sequence $C_{ch,SF_{min},k}$.

The output variables from the units 61 and 62, $Y_k$ and $X_k$, respectively, thus represent the code components of the compiled signal $x_n$ or of the provisional correction signal $y_n$. The output signal $X_k$ from the processor 62 is supplied to a comparator 63. The comparator 63 checks whether the code component $X_k$ of the compiled signal $x_n$ is greater than a second threshold value thr2. If this is the case, the associated code $C_{ch,SF_{min},k}$ or a code which precedes this code in the code tree is already being used to produce the signal $x_n$. In this case, the corresponding code $C_{ch,SF_{min},k}$ cannot be used to form the correction signal. The output signal from the comparator is set to zero in this case. If the second threshold value thr2 is not exceeded, however, it may be assumed that the code $C_{ch,SF_{min},k}$ in question is a free code which can thus be used as correction code. In this case, the comparator 63 therefore delivers an output signal with the value 1.

As a result of multiplying the code-domain-transformed signal $Y_k$ by the output signal from the comparator 63 using a multiplier 64, only the components $Y_k$ which are based on a free spread code are maintained in the output signal. The output signal from the multiplier 64 is transformed from the code domain to the time domain in a processor 65 by means of inverse code-domain transformation. The output signal from the processor 65 is then scaled in a unit 66 and is subtracted from the time-delayed input signal $x_n$ as correction signal $y'_n$ using a subtractor 67. To delay the input signal $x_n$, a delay element 68 is used; this element takes into account the processing time required to generate the correction signal $y'_n$. The choice of switch position for the switches 69 and 70 can be used for iteratively repeating the aforementioned cycle by utilizing a feedback path 71, in which case the input signal $x_n$ used is the output signal $x'_n$ from the subtractor 67 which was generated in the last iteration. As soon as the power value to be attained for the signal $x'_n$ has been reached, the power-corrected signal $x'_n$ is forwarded to the multiplier 7 (cf. FIG. 3).

A drawback of the solution described is that the correction signal is formed by using OVSF spread codes with the spread factor $SF_{min}$, the spread factor $SF_{min}$ corresponding to the smallest spread factor of the spread codes which are being used for the compiled signal. As a result, the quantity of available correction codes is generally very small, which means that a suitable correction signal $y'_n$ can be produced only poorly or not at all.

In addition, the prior art takes account neither the influence of the coding with the scrambling code nor the influence of a transmission-end pulse-shaping filter or of the two synchronization channels. Furthermore, the technical doctrine known from the prior art can be applied only when just a single scrambling code is used in a base station.

Figure 7:
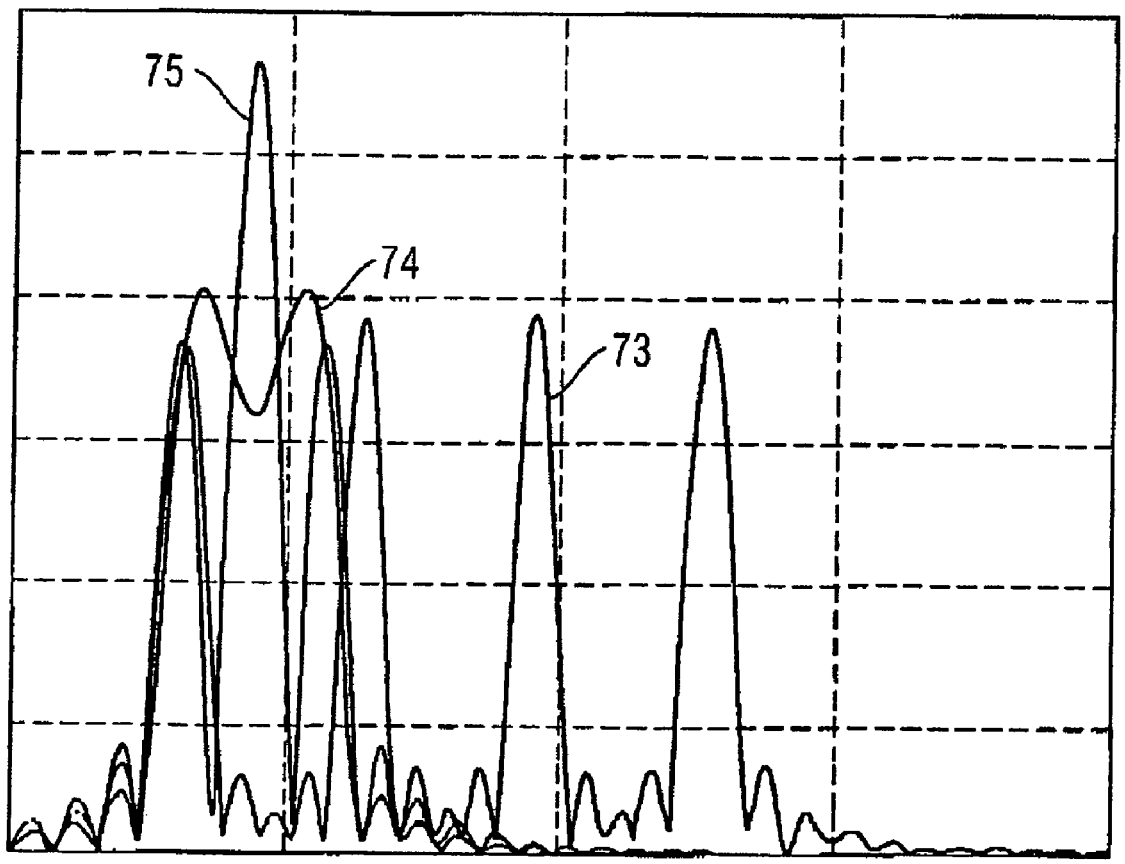
FIG. 7 shows an illustration of three output signal profiles from a pulse-shaping filter.

FIG. 7 shows the influence of the pulse-shaping filter 16 (cf. FIG. 3) using three output signal profiles 73, 74 and 75 from the pulse-shaping filter 16, these profiles differing significantly from the associated filter input sequences 73', 74' and 75'.

Figure 8:
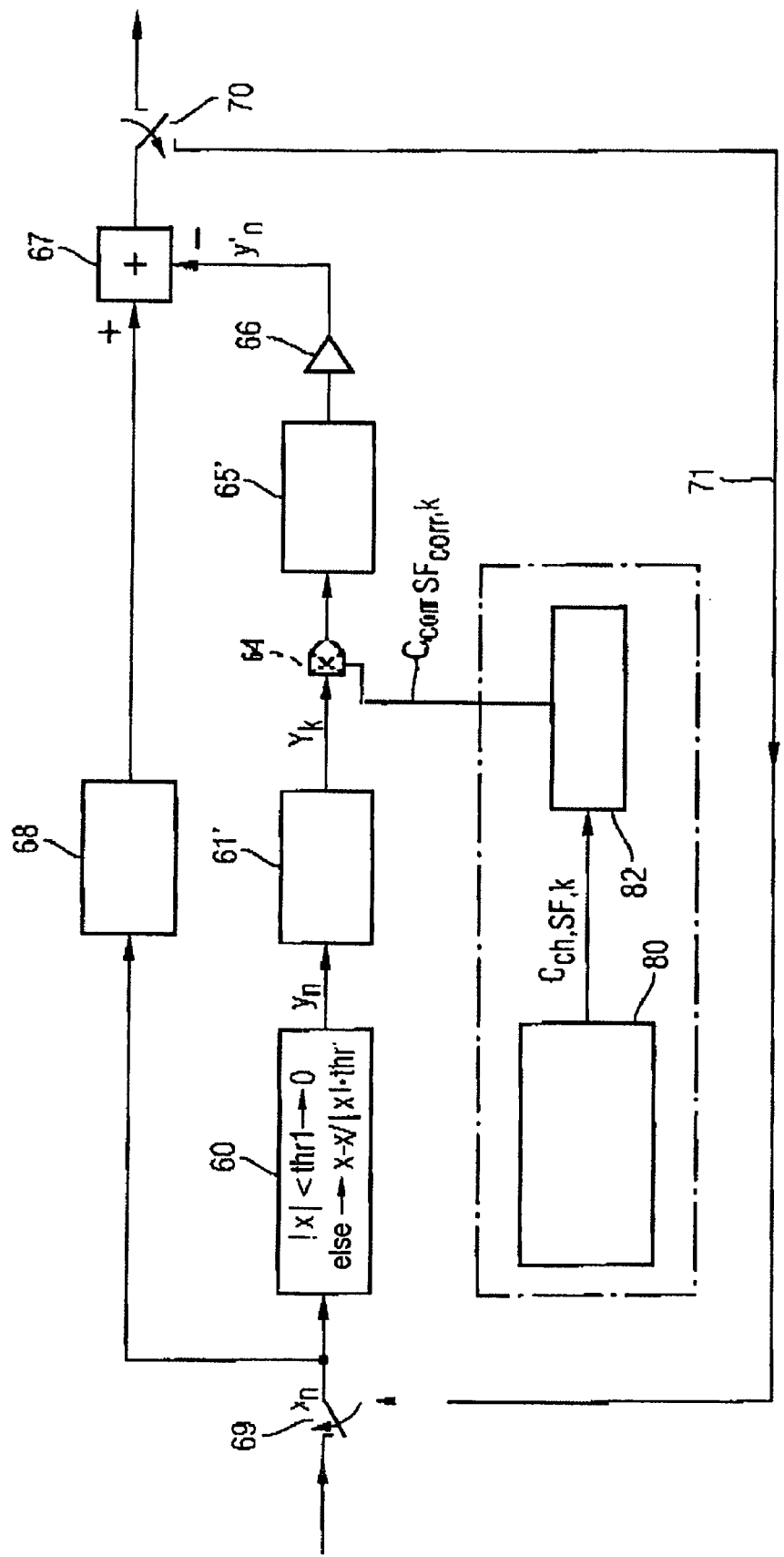
FIG. 8 shows an illustration of a first inventive circuit arrangement for power limiting in accordance with the first aspect of the invention.

FIG. 8 shows an inventive circuit for adjusting the power of the compiled signal at point C, said circuit being based on the circuit arrangement from FIG. 6. Signals and components in FIG. 6 and FIG. 8 which are provided with the same reference symbols correspond to one another. The only difference between the circuits shown in FIG. 6 and FIG. 8 is the determination of the correction codes. In FIG. 6, free spread codes used as correction spread codes for forming the correction signal are identified by virtue of code-domain transformation of the compiled signal $x_n$ being performed. In FIG. 8, however, an engagement Table 80 in the OVSF code generator (see FIG. 3) is read. In this case, an entry $C_{ch,SF,k}$ in the engagement table indicates for the OVSF code of the same name whether this code is already being used for spreading a physical channel. Using the entries in the engagement table, a processor unit 82 is able to check for each OVSF code with the same spread factor $SF_{corr}$ whether said code is suitable as a correction code. During this check, a correction code table containing the entries $C_{corr,SF_{corr},k}$ is created for the OVSF codes with the same spread factor $SF_{corr}$, said correction code table indicating for each OVSF spread code with the spread factor $SF_{corr}$ whether this code can be used as a correction code.

In FIG. 6, the common spread factor of the correction spread codes is chosen to be equal to $SF_{min}$. However, all spread factors greater than or equal to $SF_{min}$ are suitable for the firmly chosen spread factor of the correction codes $SF_{corr}$ shown in FIG. 8. The processor 61' performs code-domain transformation for the OVSF spread codes with the chosen spread factor $SF_{corr}$. The inverse code-domain transformation in the processor 65' is also based on this quantity of spread codes with the spread factor $SF_{corr}$.

The correction code table is determined by the processor 82 such that a spread code with the spread factor $SF_{corr}$ is fundamentally not a correction spread code if this spread code is a spread code which is being used or one of the spread codes with $SF>SF_{corr}$ which follows this spread code in the OVSF code tree is a spread code which is being used. A similar situation applies if one of the spread codes with $SF<SF_{corr}$ which precedes this spread code in the OVSF code tree is a spread code which is being used. The effect of this practice is that the orthogonality of the correction codes with respect to the codes which are being used is ensured.

The correction code table for the spread codes with the spread factor $SF_{corr}$ can be calculated from the following pseudo-program code by the processor 82:

--- for k = 0 to $SF_{corr}$ −1
    $C_{corr,SF_{corr},k}$ = 1 [Initialization: all potential
    correction codes $C_{corr,SF_{corr},k}$ are marked as free codes
    (1 = free)]
    for SF=2 to $SF_{MAX}$ [loop for all spread factors]
    if (SF < $SF_{corr}$)
        for k = 0 to SF-1 [loop for fixed spread factor SF]
            if ($C_{ch,SF,k}$ == 0)

$C_{corr,SF_{corr},k \cdot \frac{SF_{corr}}{SF}+0} = 0$ $C_{corr,SF_{corr},k \cdot \frac{SF_{corr}}{SF}+1} = 0$

...

$C_{corr,SF_{corr},k \cdot \frac{SF_{corr}}{SF}+\frac{SF_{corr}}{SF}-1} = 0$

[Mark the subsequent codes as non-free codes]
    else if (SF == $SF_{corr}$)
        for k = 0 to SF-1 [loop for fixed spread factor SF]
            if ($C_{ch,SF,k}$ == 0)

-continued $C_{corr,SF_{corr},k} = 0$ [mark the code as non-free code]
else if (SF > SF$_{corr}$)
    for k = 0 to SF-1 [loop for fixed spread factor SF]
        if ($C_{ch,SF,k}$ == 0)

$C_{corr,SF_{corr},\|k/\left(\frac{SF}{SF_{corr}}\right)\|} = 0$

[Mark the previous code
as non-free code; the operation |a| determines the
integer component of a]
end In the pseudo-program code, SF$_{max}$ describes the maximum spread factor of the system. For a W-CDMA system, such as a UMTS system, SF$_{max}$ is at 512. The Boolean variable $C_{ch,SF,k}$ indicates whether the spread code of the same name $C_{ch,SF,k}$ shown in the engagement table is a code which is being used. By contrast, the Boolean variable $C_{corr,SF_{corr},k}$ describes whether the potential correction spread code of the same name $C_{corr,SF_{corr},k}$ has been selected as a correction code. If the value of the Boolean variable $C_{corr,SF_{corr},k}$ is equal to 1, the spread code of the same name $C_{corr,SF_{corr},k}$ is used as correction code.

The ascertained value of the Boolean variable $C_{corr,SF_{corr},k}$ is output by the processor 82 for each potential correction code $C_{corr,SF_{corr},k}$ and is multiplied by the corresponding coefficient $Y_k$ of the transformed provisional correction signal using a multiplier 64. As a result, the output signal from the multiplier 64 retains only the components $Y_k$ which are based on a free correction code.

Figure 9:
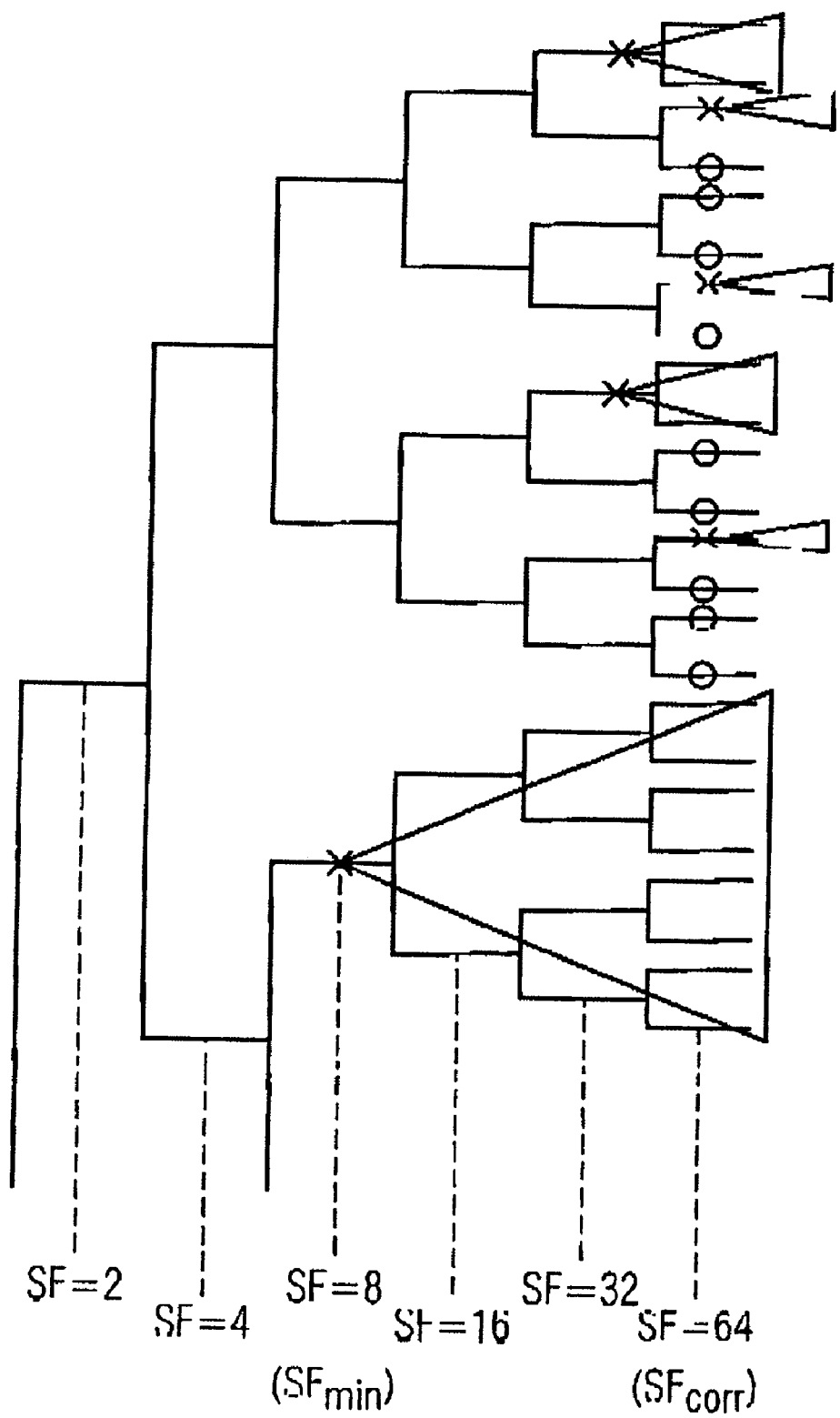
FIG. 9 shows an illustration of the inventively ascertained correction codes when engaging the OVSF code tree shown in FIG. 5.

FIG. 9 shows the inventively selected correction codes when stipulating the spread factor SF$_{corr}$ as 64 and engaging the OVSF code tree shown in FIG. 5. The selected correction codes are marked with a circle. In the example shown in FIG. 9, the spread factor used in line with the prior art is SF$_{min}$=4. In the case of a circuit for power adjustment which operates in line with the prior art, it would not be possible to use correction codes with the spread factor SF$_{min}$ in this case, since for each spread code with the spread factor SF$_{min}$ in the OVSF code tree at least one subsequent spread code or the spread code itself is already being used for spreading the compiled signal.

Figure 10:
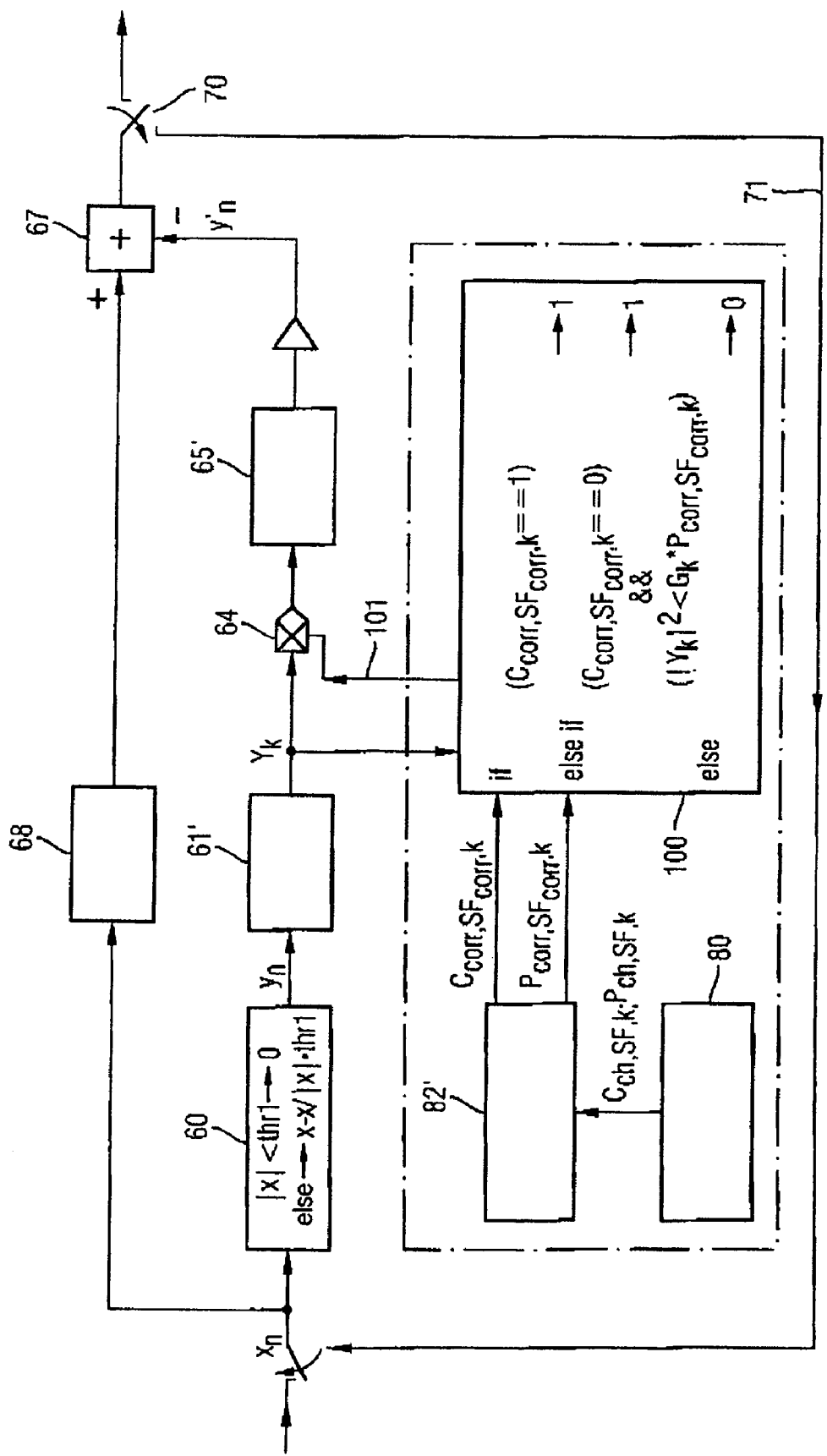
FIG. 10 shows an illustration of a second inventive circuit arrangement for power limiting in accordance with the first aspect of the invention.

FIG. 10 shows a second inventive circuit arrangement for limiting power in accordance with the first aspect of the invention, said circuit being based on the circuit shown in FIG. 8. Signals and components in FIG. 8 and FIG. 10 which are provided with the same reference symbols correspond to one another. In this context, the processor 82' has been expanded in comparison with the processor 82 from FIG. 8. In addition to the engagement information $C_{ch,SF,k}$, the processor reads first power statements $P_{ch,SF,k}$ for each OVSF code from the OVSF code generator's engagement Table 80. In this case, a first power statement $P_{ch,SF,k}$ is characteristic of the power of a signal spread-coded with the spread code $C_{ch,SF,k}$ in the compiled signal x$_n$. If a spread code $C_{ch,SF,k}$ is already being used, the first power statement $P_{ch,SF,k}$ is not equal to 0.

In this case, the processor 82' determines for each potential correction code with the spread factor SF$_{corr}$ not only the Boolean variable $C_{corr,SF_{corr},k}$ but also a second power statement $P_{corr,SF_{corr},k}$, which is respectively characteristic of the power of a signal component of the compiled signal which (signal component) is associated with a spread code with the spread factor SF$_{corr}$. This measure takes account of the idea that even if an OVSF spread code is not being used directly for a channel and its first power statement has the value 0, it nevertheless has a coefficient other than 0 for code-domain transformation of the compiled signal when a subsequent or preceding code in the OVSF code tree is being used.

The variables $C_{corr,SF_{corr},k}$ and $P_{corr,SF_{corr},k}$ calculated by the processor 82' for a potential OVSF code with the spread factor SF$_{corr}$ are read by a processor 100. The processor 100 is used to actuate the multiplier 64 using the spread-code-dependent signal 101. Only if the value of the signal 101 associated with a potential correction code corresponds to a logic 1 is the code-domain coefficient $Y_k$ received by the multiplier 64 maintained in the output signal from the multiplier 64. The value of the signal 101 corresponds to a logic 1 when the associated spread code is a free spread code ($C_{corr,SF_{corr},k}$=1) or when the spread code is not a free spread code ($C_{corr,SF_{corr},k}$=0) and the absolute-value square of the coefficient $Y_k$ is less than a particular fraction $G_k$ of the second power statement $P_{corr,SF_{corr},k}$.

In this case, the variables $C_{corr,SF_{corr},k}$ and $P_{corr,SF_{corr},k}$ can be calculated in the processor 82' using the following pseudo-program code, which is based on the pseudo-program code indicated above:

for k = 0 to SF$_{corr}$-1
  $C_{corr,SF_{corr},k}$ = 1 [Initialization: all potential correction codes $C_{corr,SF_{corr},k}$ are marked as free codes (1 = free)]
  $P_{corr,SF_{corr},k}$ = 0 [Initialization: power values of all potential correction codes $C_{corr,SF_{corr},k}$ are set to zero]
for SF = 2 to SF$_{MAX}$ [loop for all spread factors]
  if (SF < SF$_{corr}$)
    for k = 0 to SF-1 [loop for fixed spread factor SF]
      if ($C_{ch,SF,k}$ == 0 ) {

$C_{corr,SF_{corr},k \cdot \frac{SF_{corr}}{SF} + 0} = 0$ $C_{corr,SF_{corr},k \cdot \frac{SF_{corr}}{SF} + 1} = 0$

...

$C_{corr,SF_{corr},k \cdot \frac{SF_{corr}}{SF} + \frac{SF_{corr}}{SF} - 1} = 0$

[Mark the subsequent codes as non-free codes]

$P_{corr,SF_{corr},k \cdot \frac{SF_{corr}}{SF} + 0} = \frac{P_{ch,SF,k}}{SF_{corr}/SF} + P_{corr,SF_{corr},k \cdot \frac{SF_{corr}}{SF} + 0}$ $P_{corr,SF_{corr},k \cdot \frac{SF_{corr}}{SF} + 1} = \frac{P_{ch,SF,k}}{SF_{corr}/SF} + P_{corr,SF_{corr},k \cdot \frac{SF_{corr}}{SF} + 1}$

...

$P_{corr,SF_{corr},k \cdot \frac{SF_{corr}}{SF} + \frac{SF_{corr}}{SF} - 1} = \frac{P_{ch,SF,k}}{SF_{corr}/SF} + P_{corr,SF_{corr},k \cdot \frac{SF_{corr}}{SF} + \frac{SF_{corr}}{SF} - 1}$ {
  else if (SF == SF$_{corr}$)
    for k = 0 to SF-1 [Loop for fixed spread factor SF]
      if ($C_{ch,SF,k}$ == 0)
        $C_{corr,SF_{corr},k}$ = 0 [Mark the code as non-free code]
        $P_{corr,SF_{corr},k}$ = $P_{ch,SF,k}$ + $P_{corr,SF_{corr},k}$
  }
  else if (SF > SF$_{corr}$)
    for k = 0 to SF-1 [loop for fixed spread factor SF]
      if ($C_{ch,SF,k}$==0) {

$C_{corr,SF_{corr},\|k/\left(\frac{SF}{SF_{corr}}\right)\|} = 0$

[Mark the preceding code as non-free code]

-continued $$P_{corr,SF_{corr}} \cdot \left\| k / \left( \frac{SF}{SF_{corr}} \right) \right\| = P_{corr,SF_{corr}} \cdot \left\| k / \left( \frac{SF}{SF_{corr}} \right) \right\| + P_{ch,SF,k}$$

}
end

If an OVSF code with a spread factor SF<$SF_{corr}$ is being used, the second power statement $P_{corr,SF_{corr},k}$ is determined for the spread codes with the spread factor $SF_{corr}$ which follow in the OVSF code tree by virtue of the first power statement $P_{ch,SF,k}$ being multiplied by the factor $SF/SF_{corr}$. To ascertain the second power statement $P_{corr,SF_{corr},k}$, the result of the multiplication is added to any second power statement $P_{corr,SF_{corr},k}$ which has already been ascertained in prior computation steps.

However, if the spread factor SF of an OVSF code which is being used is equal to the spread factor $SF_{corr}$ of the correction code, the second power statement $P_{corr,SF_{corr},k}$ for the same OVSF spread code is obtained from the first power statement $P_{ch,SF,k}$ plus any second power statement $P_{corr,SF_{corr},k}$ for the same OVSF spread code which has already been ascertained in prior computation steps.

If an OVSF code with a spread factor SF>$SF_{corr}$ is being used, the second power statement $P_{corr,SF_{corr},k}$ is determined for the spread code with the spread factor $SF_{corr}$ which comes beforehand in the OVSF code tree by virtue of the first power statement $P_{ch,SF,k}$ of the spread code which is being used and any second power statement $P_{corr,SF_{corr},k}$ for the previous OVSF spread code which has already been ascertained in the prior computation steps being added.

Figure 11:
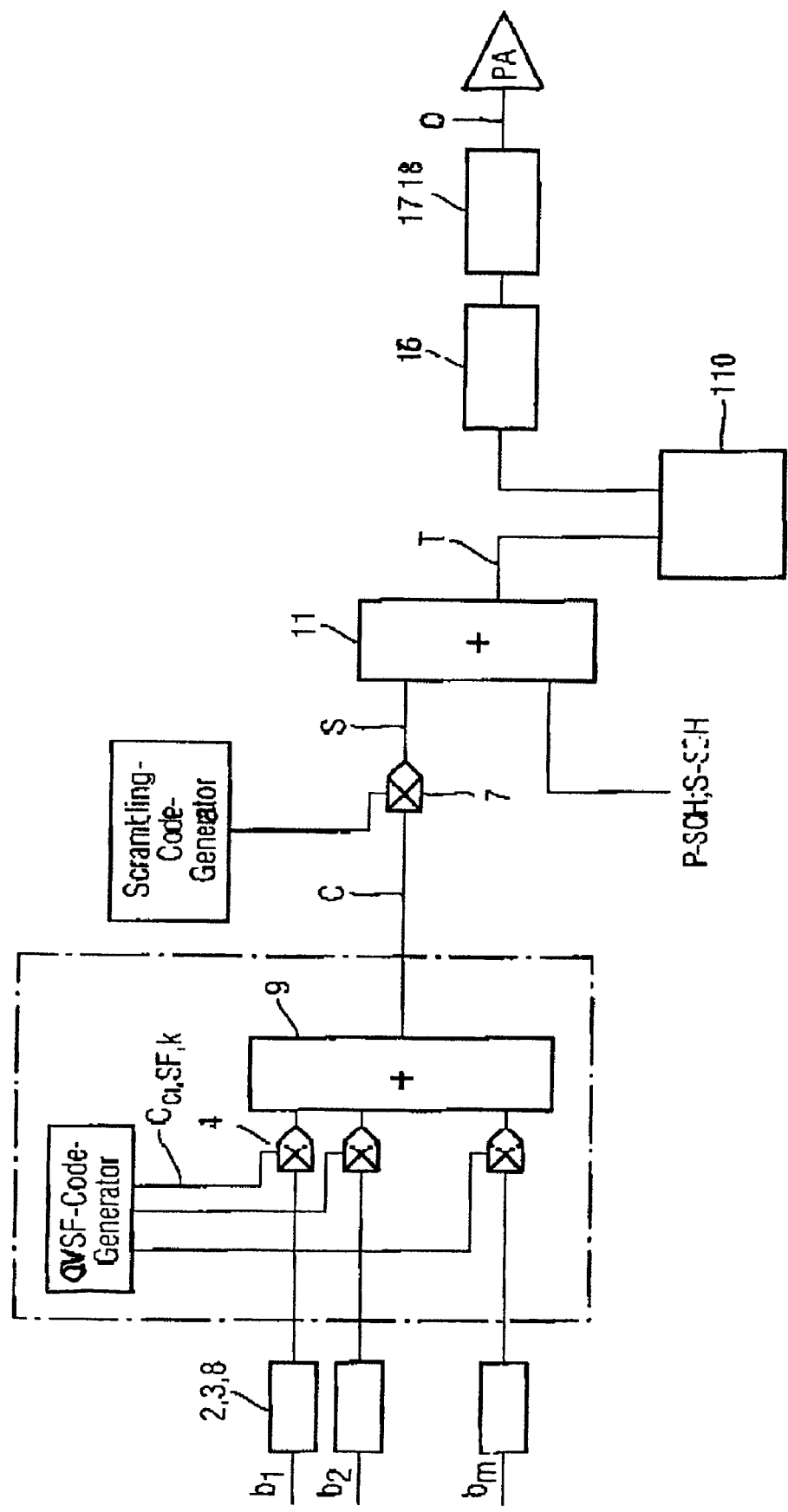
FIG. 11 shows an illustration of a circuit arrangement (based on FIG. 3) for spread coding and modulation with power limiting at point T in accordance with the second aspect of the invention.

The second aspect of the invention relates to the inclusion of the scrambling operation in the power limiting. The circuit for power limiting shown in FIG. 6, which is already known from the prior art, processes the compiled signal at point C (cf. FIG. 3). During the power limiting for the compiled signal at point C, neither the scrambling operation nor the subsequent addition of the synchronization channels P-SCH and S-SCH is taken into account. A signal whose power has been corrected at point C therefore does not necessarily have the required dynamic range after the scrambling operation and the addition of the synchronization channels. To take account of these influences, the invention therefore proposes making the power correction at point T (cf. FIG. 3). FIG. 11 shows a circuit arrangement for spread coding and modulation which is based on FIG. 3 and which has a circuit 110 for power limiting at point T. Signals and components in FIG. 3 and FIG. 11 which have been provided with the same reference symbols correspond to one another in this case. For this configuration, it is possible to take account of the influence of the scrambling operation and of the subsequent addition of the synchronization channels P-SCH and S-SCH.

Figure 12:
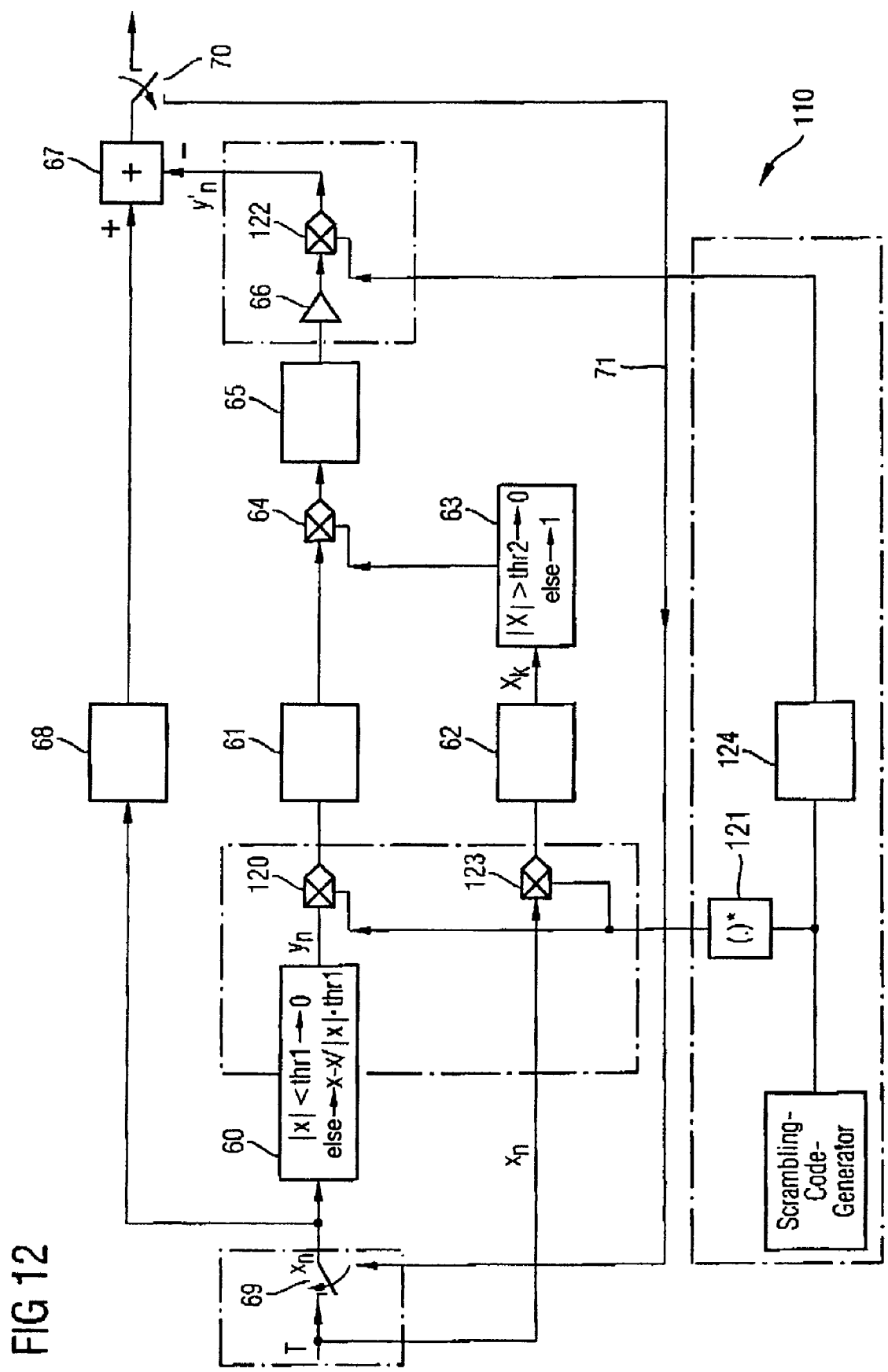
FIG. 12 to FIG. 17 show illustrations of various inventive circuit arrangements for power limiting in accordance with the second aspect of the invention.

FIG. 12 shows a first implementation proposal for the circuit 110 (cf. FIG. 11). The implementation is based on the circuit shown in FIG. 6. Signals and components in FIG. 6 and FIG. 12 which have been provided with the same reference symbols correspond to one another in this case. In the case of the circuit arrangement shown in FIG. 12, the provisional correction signal $y_n$ is first multiplied by the inverted scrambling code using a multiplier 120. The inverted scrambling code is determined by inverting a scrambling code in a processor 121. The provisional correction signal decoded with the inverted scrambling code is then subjected to code-domain transformation in the processor 61. The components of the transformed signal which are based on free codes are determined using the multiplier 64. The output signal from the multiplier 64 is then subjected to inverse code-domain transformation in the processor 65. The signal generated in this manner is then coded with the scrambling code delayed using a delay element 124 by means of a multiplier 122. The output signal from the multiplier 122 forms the correction signal $y'_n$.

To select the correction codes, unlike in the procedure shown in FIG. 6 the compiled signal $x_n$ is first decoded with the inverted scrambling code by means of a multiplier 123 before code-domain transformation is carried out.

Figure 13:
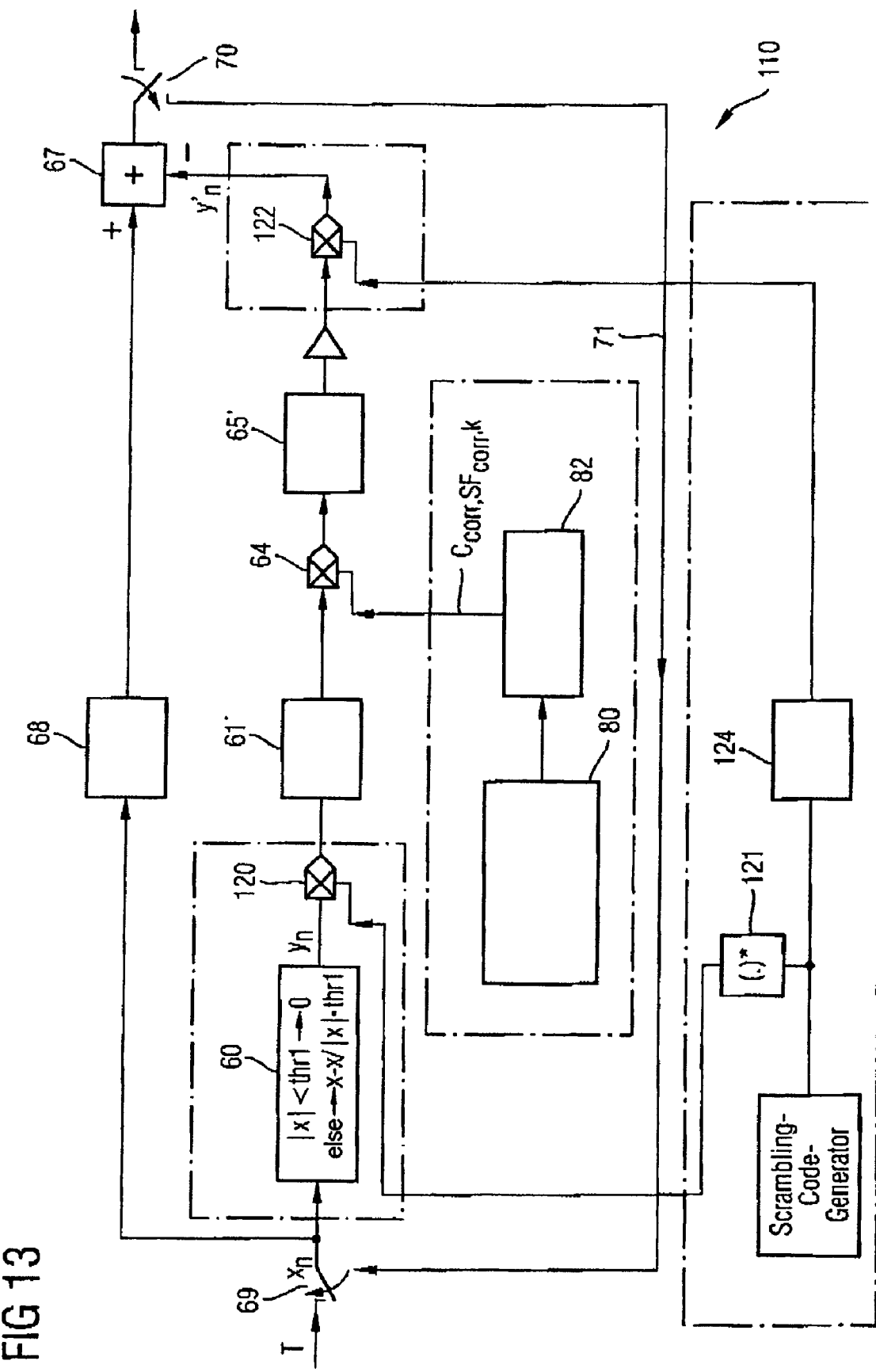
Figure 14:
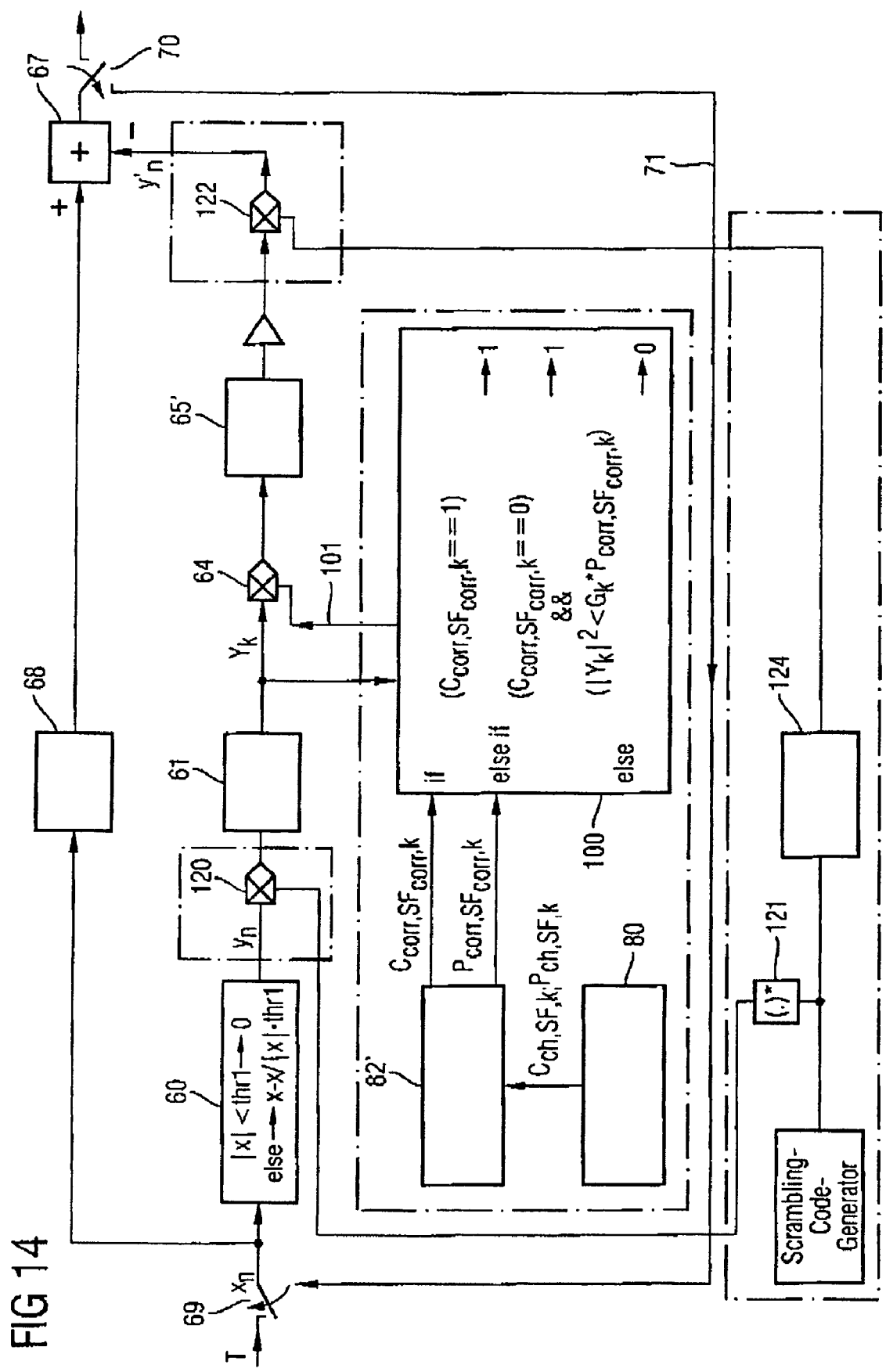

The decoding of the provisional correction signal $y_n$ which is shown in FIG. 12 can be combined with the procedure for selecting the correction codes which is shown in FIG. 8 and FIG. 10. The corresponding circuit arrangements 110 are shown in FIG. 13 and FIG. 14. Signals and components from FIG. 8, FIG. 12 and FIG. 13 or from FIG. 10, FIG. 12 and FIG. 14 which have been provided with the same reference symbols correspond to one another in this case.

As an alternative to the arrangement shown in FIG. 11, the circuit for power limiting 110 can also be positioned at point S, i.e. before the addition of the synchronization channels P-SCH and S-SCH using the adder 11. In this case, the influence of the synchronization channels is not taken into account when determining the correction signal. The forms of implementation for the circuit for power limiting 110 which are shown in FIGS. 12 to 14 are not changed in this case.

Figure 15:
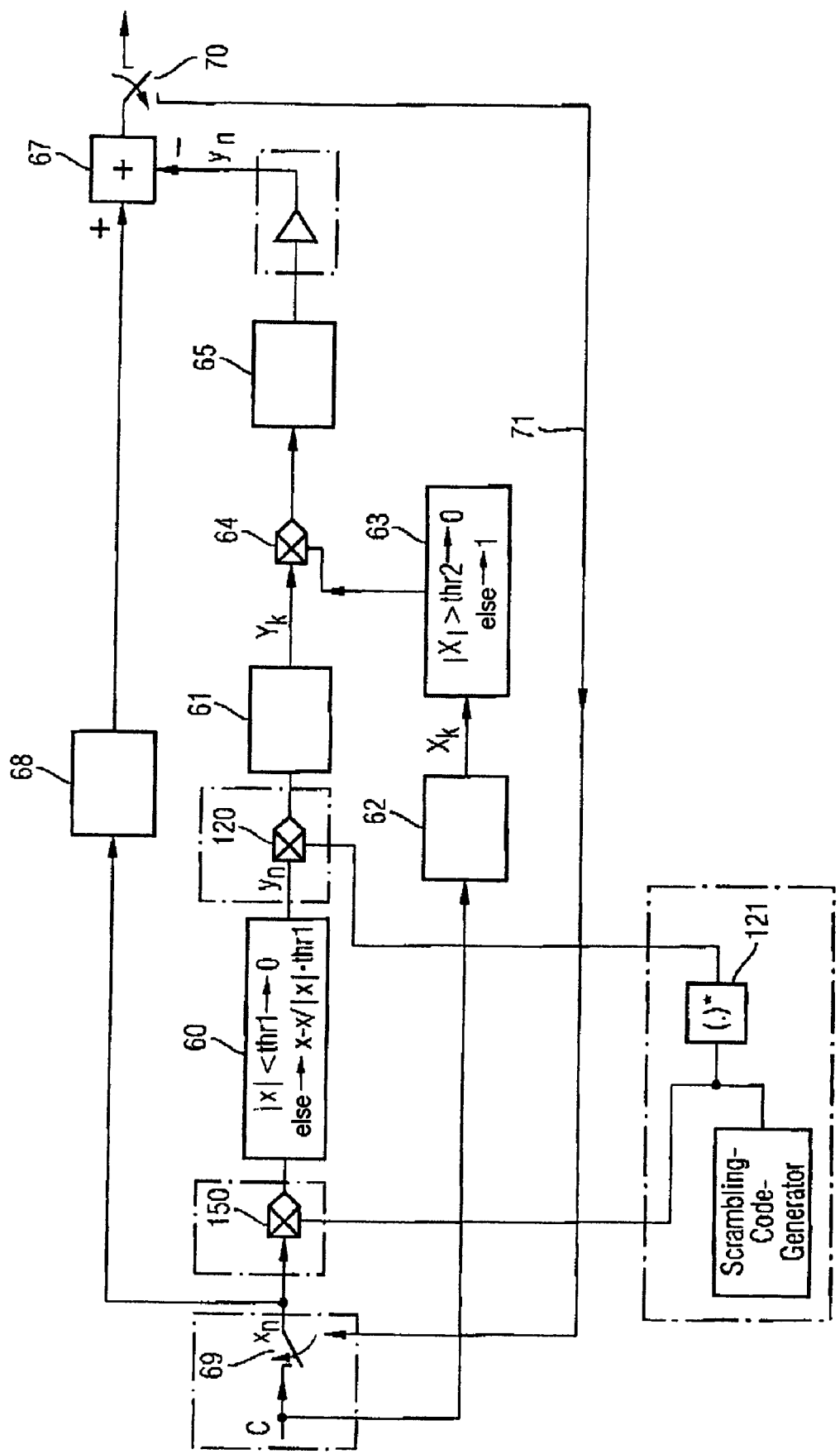

In addition, it is conceivable within the context of the invention to perform the power limiting for the compiled signal at point C (cf. FIG. 11). In this case, it is nevertheless possible for the effect of the scrambling operation (multiplier 7) actually to be taken into account beforehand. FIG. 15 shows a corresponding implementation of the circuit for power limiting. This circuit is based on the circuit shown in FIG. 12. Signals and components from FIG. 12 and FIG. 15 which have been provided with the same reference symbols correspond to one another. In contrast to the circuit shown in FIG. 12, in FIG. 15 the compiled signal $x_n$ is coded with the scrambling code by means of a multiplier 150 before the provisional correction signal $y_n$ is calculated. Since the compiled signal $x_n$ at point C is a signal which has not yet been coded with the scrambling code, it is also possible in the circuit shown in FIG. 15 to dispense with the coding with the scrambling code by means of the multiplier 122 which is shown in FIG. 12. In addition, the descrambling using the multiplier 123 shown in FIG. 12 is also dispensed with for this reason.

Figure 16:
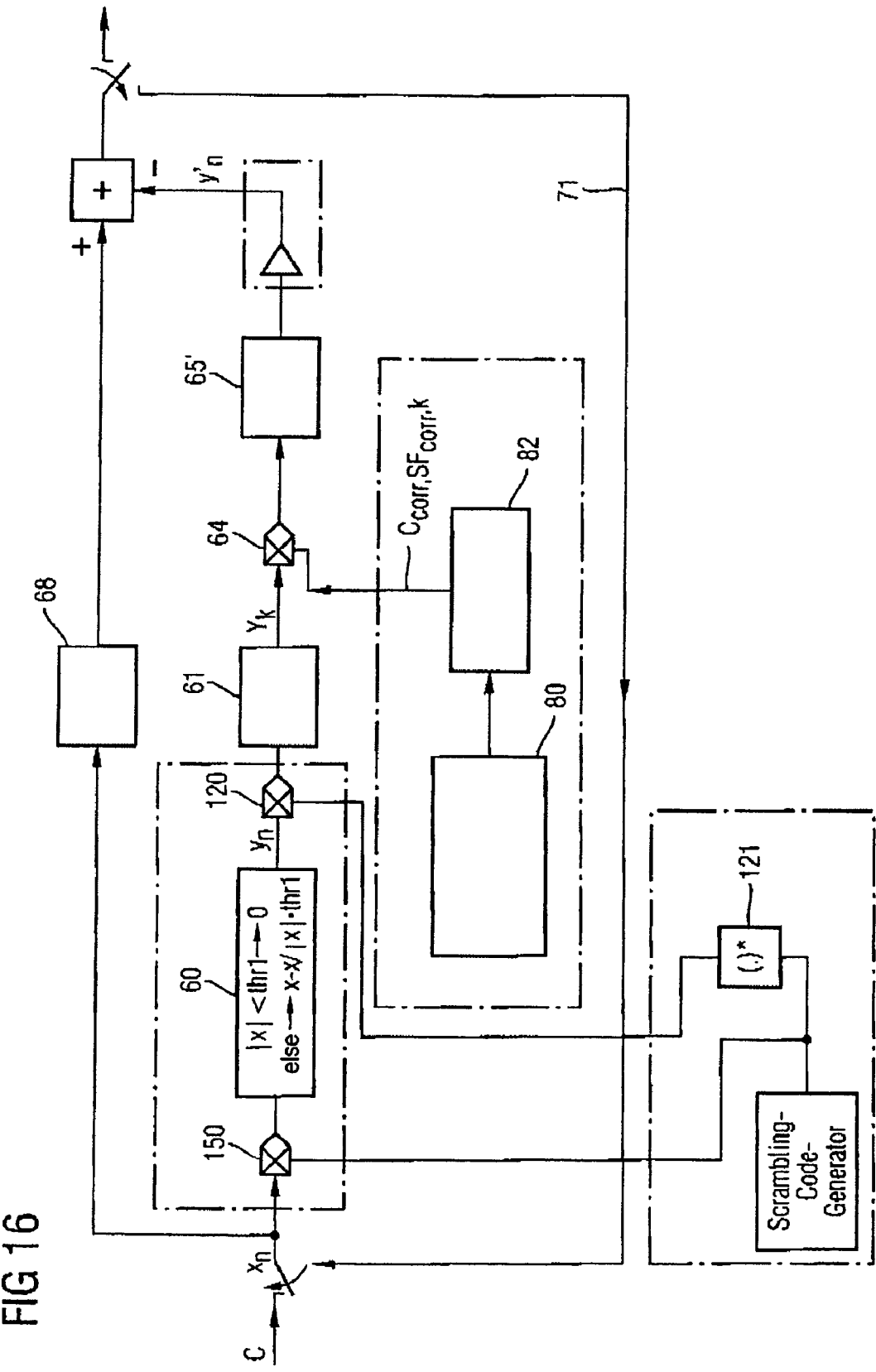
Figure 17:
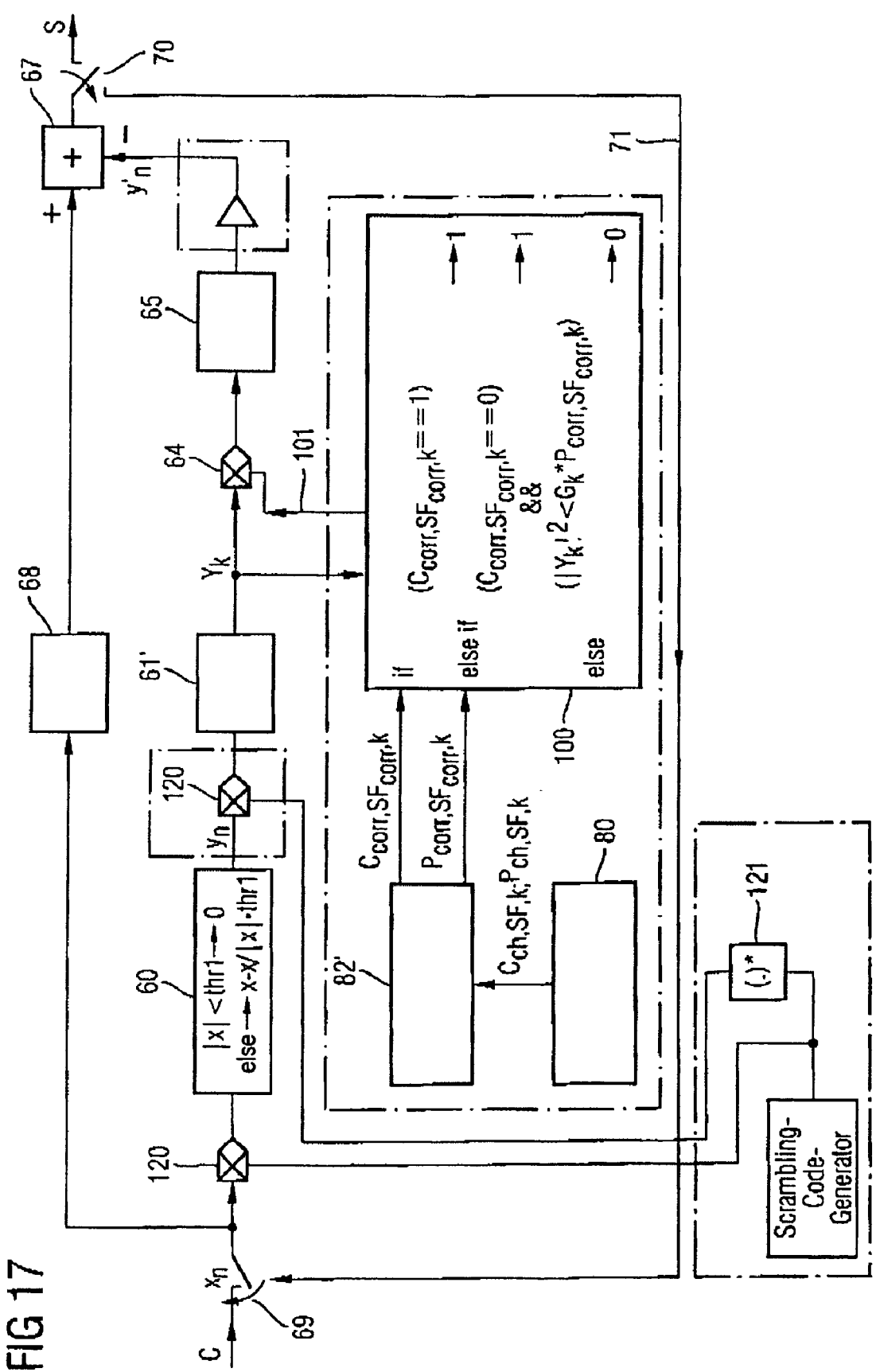

Correspondingly, it is also possible to modify the circuits shown in FIG. 13 and FIG. 14 such that the resultant circuits perform power limiting for the compiled signal at point C taking into account the later scrambling operation (multiplier 7). The circuits in question are shown in FIG. 16 and FIG. 17. Signals and components from FIG. 13 and FIG. 16 or from FIG. 14 and FIG. 17 which have been provided with the same reference symbols correspond to one another in this case.

The third aspect of the invention relates to the inclusion of the signal shaping of one or more digital, analogue or mixed-signal signal processing stages which are used for the further processing of the compiled signal after the scrambling operation. These signal processing stages generally have an influence on the dynamic range of the signal at the input of the power amplifier. This influence needs to be taken into account when calculating the correction signal.

Figure 18:
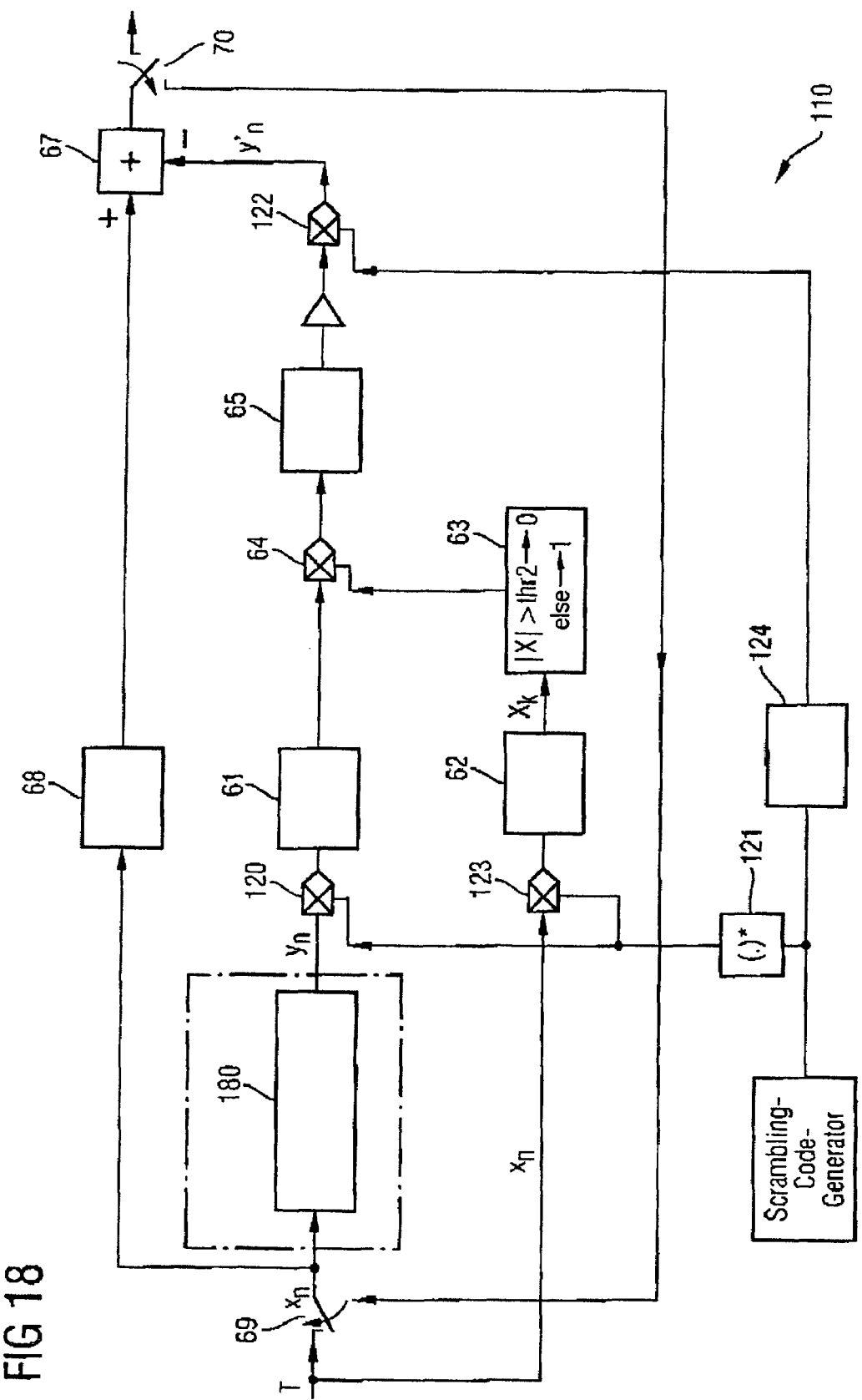
FIG. 18 shows an illustration of a circuit arrangement (based on FIG. 12) for power limiting in accordance with the third aspect of the invention.

A circuit for power limiting which takes account of this influence is shown in FIG. 18. This circuit is based on the circuit shown in FIG. 12 and is used for limiting the power of the compiled signal at point T (cf. FIG. 3). Alternatively, it is also possible to provide for power limiting at point S, i.e. without taking into account the synchronization channels P-SCH and S-SCH. Signals and components from FIG. 12 and FIG. 18 which have been provided with the same reference symbols correspond to one another in this case. The only difference between the circuits shown in FIG. 12 and FIG. 18 is that in FIG. 18 an expanded processor 180 is used to determine the provisional correction signal instead of the processor 60. In this case, it should be remembered that the expanded processor 180 operates at an increased sampling rate, since the influence of the aforementioned signal processing stages cannot be simulated with sufficient accuracy otherwise.

Figure 19:
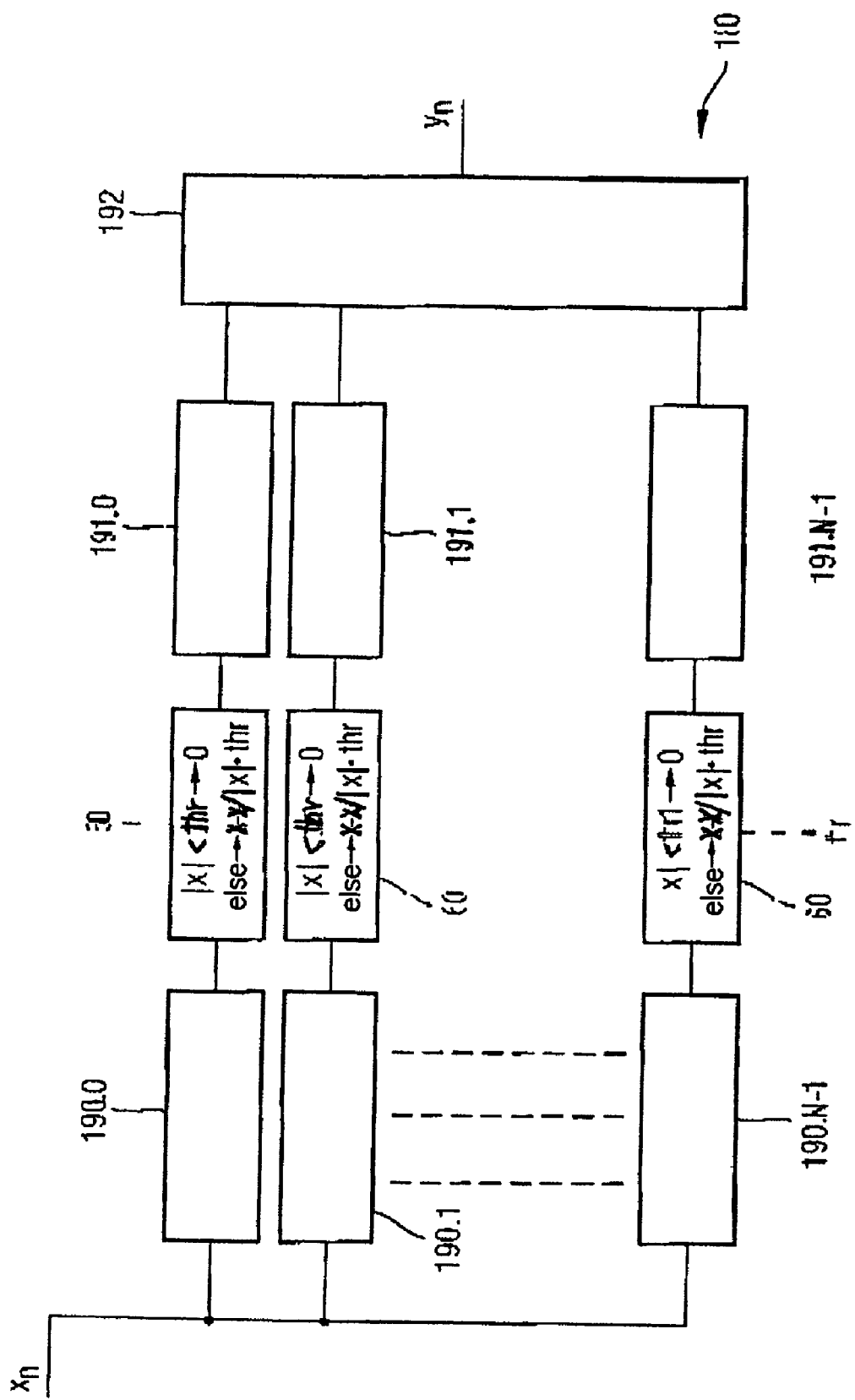
FIG. 19 shows an illustration of a first form of implementation of an extended processor for determining the provisional correction signal in accordance with the third aspect of the invention.
Figure 20:
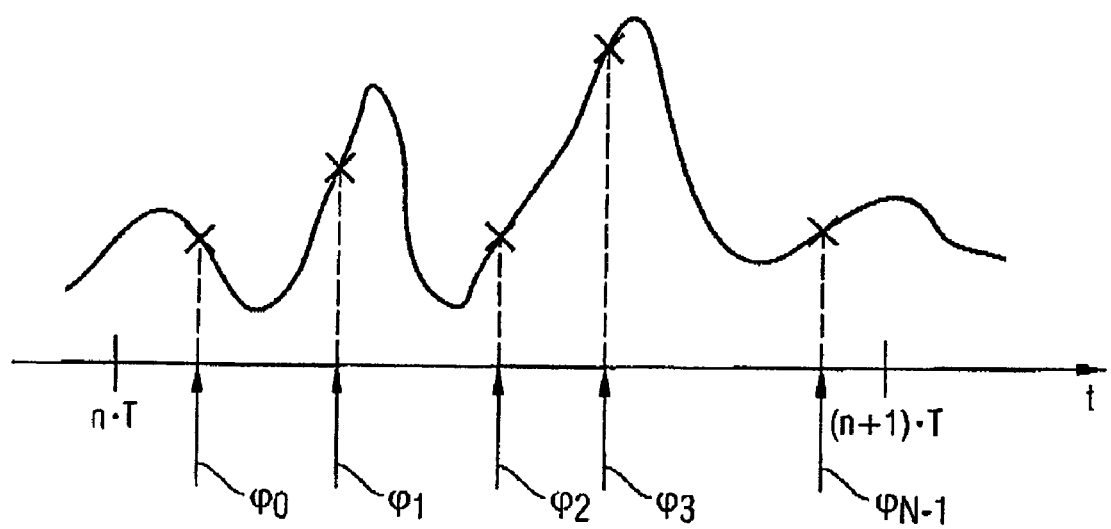
FIG. 20 shows an illustration of the arrangement of various phase angles $\phi_0, \phi_1, \ldots, \phi_{N-1}$ between two sampling times nT and (n+1)T.

Various approaches are conceivable for implementing the expanded processor 180, in the case of the first implementation approach for the expanded processor 180 which is shown in FIG. 19, a polyphase-based implementation is chosen. The input signal $x_n$ at a sampling rate which corresponds to the chip rate is fed into N parallel predictor filters 190.0 to 190.N−1. In this case, the predictor filters 190.0 to 190.N−1 are associated with various phase angles $\phi_0, \phi_1, \ldots, \phi_{N-1}$ between two sampling times nT and (n+1)T (where T=1/chip rate). FIG. 20 shows the arrangement of the various phase angles $\phi_0, \phi_1, \ldots, \phi_{N-1}$ between two sampling times nT and (n+1)T and also the corresponding output signals (respectively marked with a cross) from the predictor filters 190.0 to 190.N−1.

For each phase angle $\phi_0, \phi_1, \ldots, \phi_{N-1}$, a complex sample which corresponds to the signal profile at the output of one of the aforementioned signal processing stages, that is to say for example at the output of the pulse-shaping filter 16 or at the output of the digital/analogue converter or at the output of the mixer 17 (and hence at the input of the power amplifier), is determined in the corresponding predictor filter 190.0 to 190.N−1. Each output signal from the predictor filters 190.0 to 190.N−1 is respectively compared with a threshold value in N different processors 60. If the threshold value thr is exceeded, the corresponding processor 60 outputs a signal which differs from 0. The output signal from a respective processor 60 is respectively fed into a correction filter 191.0 to 191.N−1. In this case, each correction filter 191.0 to 191.N−1 corrects the respectively received signal such that the filter operation of the respective corresponding predictor filter 190.0 to 190.N−1 is reversed. The N output signals from the correction filters 191.0 to 191.N−1 are collected in a unit 192 and are combined to form a total signal. This signal corresponds to the provisional correction signal $y_n$ and forms the output signal from the expanded processor 180.

Figure 21:
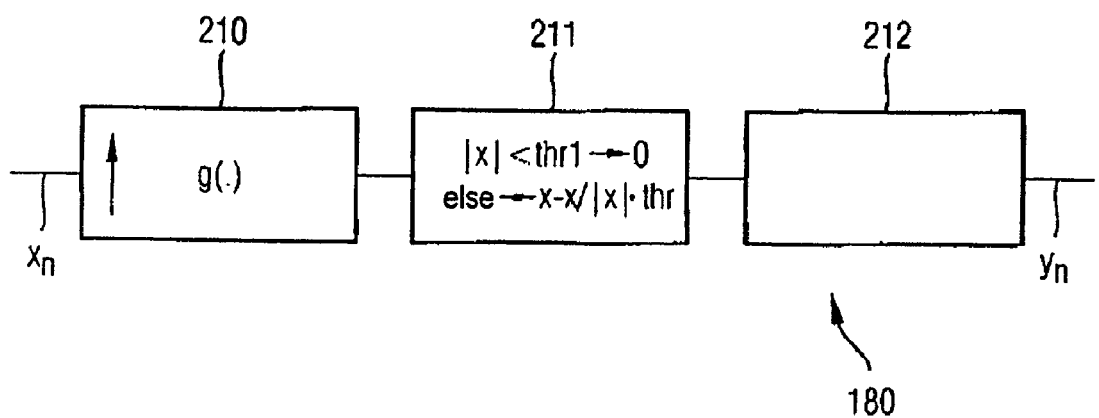
FIG. 21 shows an illustration of a second form of implementation of the extended processor for determining the provisional correction signal in accordance with the third aspect of the invention.

As an alternative to the implementation approach shown in FIG. 19, the expanded processor 180 can be implemented as shown in FIG. 21. In this embodiment, the interval between adjacent phase angles $\phi_0, \phi_1, \ldots, \phi_{N-1}$ is equidistant. The input signal $x_n$ sampled at the chip rate is received by a single predictor filter 210, with the predictor filter 210 operating as an interpolation filter with oversampling. The output signal from the predictor filter is fed into a processor 211, with the mode of operation of the processor 211 being fundamentally equivalent to that of the processors 60 shown in FIG. 19. In contrast the processor 60, the processor 211 operates with oversampling, however. The output signal from the processor 211 is fed into a correction filter 212. In this case, the correction filter 212 corrects the received signal such that the filter operation of the predictor filter 210 is reversed. In addition, the sampling rate of the output signal $y_n$ again corresponds to the chip rate.

The expansion of the circuit from FIG. 12 which is shown in FIG. 18 can also be transferred in similar fashion to the circuits shown in FIG. 13 and FIG. 14. In this case, only the respective processor 16 needs to be replaced by the expanded processor 180.

In addition, in similar fashion the circuits for limiting the power of the compiled signal at point C which are shown in FIG. 15 to FIG. 17 can also be expanded by respectively replacing the processor 60 with the processor 180.

A circuit operating in line with the fourth aspect of the invention is used to limit the power of a compiled signal which is compiled from M signals coded with different scrambling codes.

Figure 22:
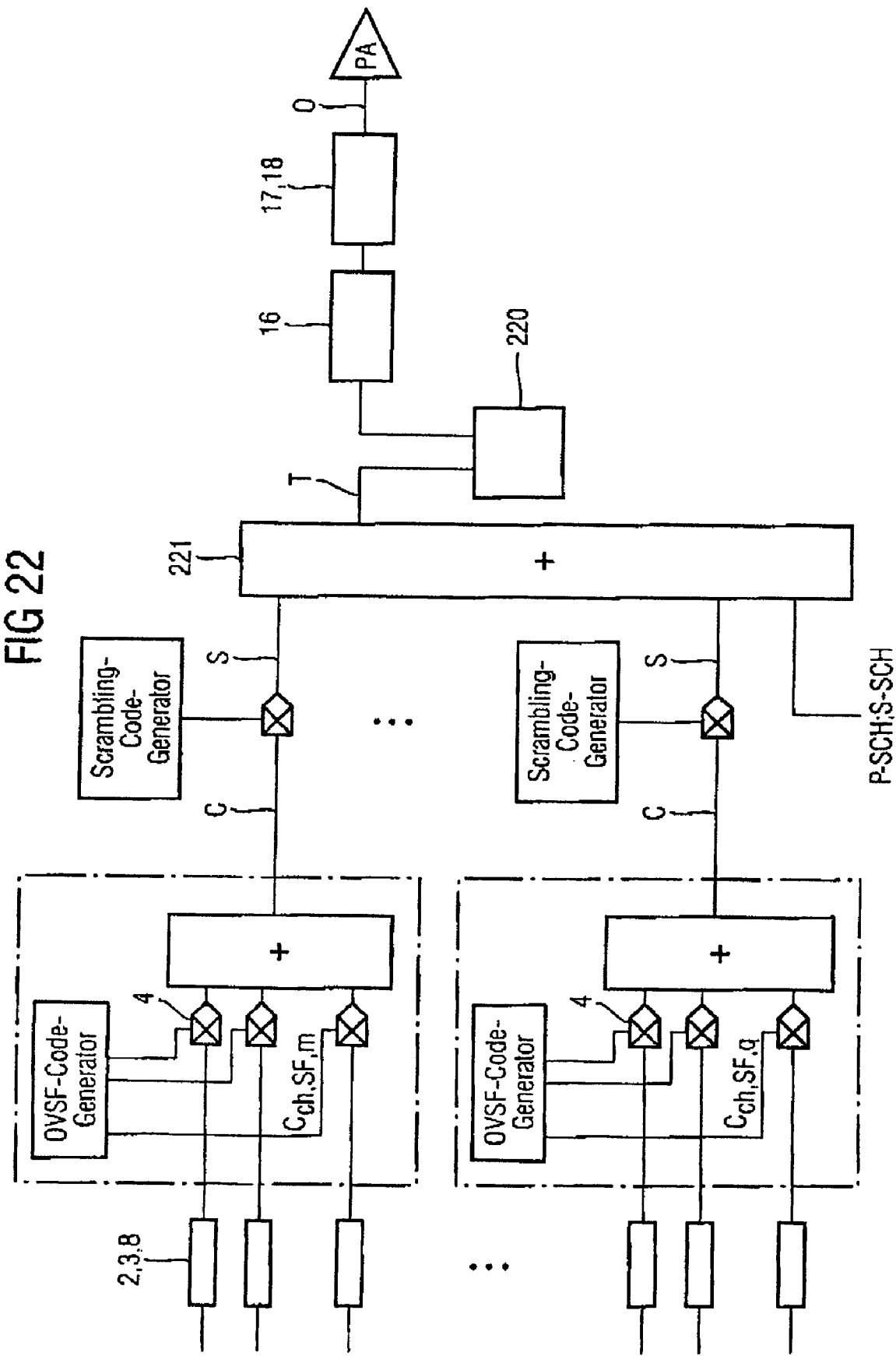
FIG. 22 shows an illustration of a circuit arrangement for spread coding and modulation with M different scrambling codes.

FIG. 22 shows a circuit arrangement for spread-coding and modulation with M different scrambling codes which has a circuit 220 for limiting the power of the compiled signal at point T. A plurality of spread-coded signals coded with the same scrambling code are processed together. The compiled signals at point S which are coded with the scrambling code are overlaid in an adder 221 together with the synchronization channels P-SCH and S-SCH. In this case, the power limiting takes place at point T, i.e. at the output of the adder 221.

Figure 23:
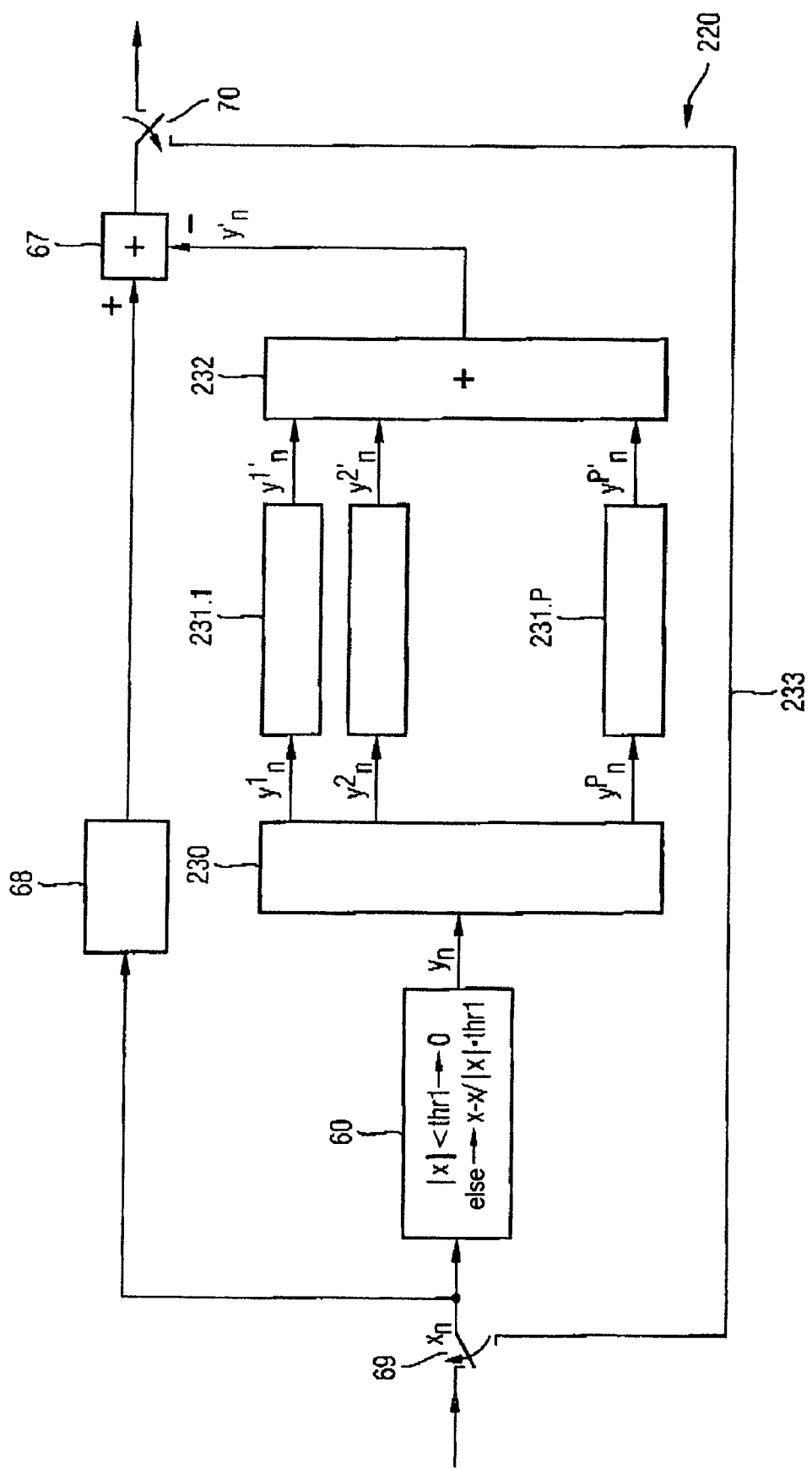
FIG. 23 shows an illustration of the implementation of the circuit for power limiting as shown in FIG. 22.

FIG. 23 shows a proposal for implementing the circuit 220 for power limiting. The signal $x_n$ is—as already described above—evaluated in the processor 60 such that a first provisional correction signal is—as already described above— evaluated in the processor 60 such that a first provisional correction signal $y_n$ is generated. The first provisional correction signal $y_n$ is split into P (where M≧P) parallel second provisional correction signal $y^1_n$ to $y^P_n$ by means of a unit 230. In this case, every second provisional correction signal $y^1_n$ to $y^P_n$ is associated with a different scrambling code.

In this case, the split can be made on the basis of various criteria. It is conceivable to split the first provisional correction signal $y_n$ to produce equal parts. Alternatively, the first provisional correction signal $y_n$ may also be split proportionally to the RMS value of the compiled signals at point S or to the average of the absolute value of these signals.

The second provisional correction signals $y^1_n$ to $y^P_n$ are respectively fed into the circuits 231.1 to 231.P. These circuits respectively produce correction signals $y^{1'}_n$ to $y^{P'}_n$ from the provisional correction signals $y^1_n$ to $y^P_n$. The correction signals $y^{1'}_n$ to $y^{P'}_n$ are obtained from the provisional correction signals $y^1_n$ to $y^P_n$ by selecting the signal components based on suitable correction spread codes. In this case, each of the circuits 231.1 to 231.P can be implemented in similar fashion to one of the above-described circuits for limiting the power of signals at point T (for example in similar fashion to FIGS. 12 to 14). In the case of such an implementation, however, the circuit blocks 60, 67 and 68 and also the feedback path 71 are not needed.

The generated P correction signals $y^{1'}_n$ to $y^{P'}_n$ are overlaid in an adder 232 to form the correction signal $y'_n$. The correction signal $y'_n$ is then subtracted from the input signal $x_n$, whose timing has been delayed using the delay element 68. The choice of switch position for the switches 69 and 70 can be used for iteratively repeating the aforementioned cycle by utilizing a feedback path 233.

As an alternative to the processor 60 shown in FIG. 23, it is also possible to provide one of the expanded processors 180 shown in FIG. 19 or FIG. 21 for the purpose of determining the provisional correction signal $y_n$.

What is claimed is:

1. A method for limiting the power of a transmission-end signal compiled from a plurality of differently spread-coded signals, the spread codes used for the differently spread-coded signals being known code engagement information, the method comprising:

a) selecting, with a circuit, correction spread codes by evaluating the code engagement information, wherein more than one spread factor are permitted in the code engagement information;

b) forming, with a circuit, a spread-coded correction signal on the basis of the selected correction spread codes; and c) overlaying, with a circuit, the compiled signal with the correction signal formed, wherein the selection of the correction spread codes in a) is also performed on the basis of first power statements which are each characteristic of the power of a spread-coded signal in the compiled signal.

2. The method according to claim 1, wherein each of the correction spread codes has the same spread factor.

3. The method according to claim 2, wherein the spread codes which are being used and the correction spread codes are OVSF spread codes.

4. The method according to claim 3, wherein in a) a spread code with the spread factor $SF_{corr}$ is fundamentally not a correction spread code if one of the spread codes with $SF > SF_{corr}$ which follow this spread code in the OVSF code tree is a spread code which is being used.

5. The method according to claim 3, wherein in a) a spread code with the spread factor $SF_{corr}$ is fundamentally not a correction spread code if one of the spread codes with $SF < SF_{corr}$ which precede this spread code in the OVSF code tree is a spread code which is being used.

6. The method according to claim 3, wherein in a) a spread code with the spread factor $SF_{corr}$ is fundamentally not a correction spread code if this spread code is a spread code which is being used.

7. The method according to claim 3, wherein the method permits the spread factor $SF_{corr}$ to be greater than or equal to the smallest spread factor $SF_{min}$ of the spread codes which are being used.

8. The method according to claim 3, wherein the selection from method step a) is updated if the quantity of spread codes which are being used changes.

9. The method according to claim 1, wherein in a) one or more spread codes with the spread factor $SF_{corr}$ have second power statements determined for it/them which are each characteristic of the power of a signal component of the compiled signal which is associated with a spread code with the spread factor $SF_{corr}$.

10. The method according to claim 9, further comprising:
forming a provisional correction signal on the basis of the compiled signal, and
performing code-domain transformation of the provisional correction signal for the spread codes with the spread factor $SF_{corr}$,
wherein in method step a) a spread code with the spread factor $SF_{corr}$ is imperatively selected as correction spread code if the absolute-value square of the spread code's allocated coefficient for the code-domain transformation of the provisional correction signal is less than a particular fraction of the second power statement of the same spread code.

11. The method of claim 1, wherein more than one spread factor are permitted in the selected correction spread codes.

12. A method for limiting the power of a transmission-end signal compiled from a plurality of differently spread-coded signals in a W-CDMA radio device, said signal being coded with a scrambling code, the method comprising:

a) forming, with a circuit, a spread-coded correction signal from the compiled signal on the basis of correction spread codes comprising:

a1) forming a provisional correction signal from the compiled signal;

a2) decoding the provisional correction signal with the inverted scrambling code;

a3) selecting those signal components of the decoded provisional correction signal which are based on the correction spread codes;

a4) coding the selected signal components are with the scrambling code; and a5) forming the correction signal on the basis of the signal components coded with the scrambling code, and b) overlaying, with a circuit, the compiled signal with the correction signal formed.

13. The method according to claim 12, wherein the method is used in a W-CDMA-based base station, and the compiled signal additionally comprises the data of the synchronization channels.

14. A method for limiting the power of a transmission-end signal compiled from a plurality of differently spread-coded signals in a W-CDMA radio device, said signal not yet being coded with a scrambling code, the method comprising:

a) coding the compiled signal with the scrambling code associated with the compiled signal and forming, with a circuit, a correction signal from the scrambled compiled signal on the basis of correction spread codes comprising:

a1) forming a provisional correction signal from the compiled signal coded with the scrambling code;

a2) decoding the provisional correction signal with the inverted scrambling code;

a3) selecting those signal components of the decoded provisional correction signal which are based on the correction spread codes; and a4) forming the correction signal on the basis of the selected signal components, and b) overlaying, with a circuit, the compiled signal with the correction signal formed, wherein step a) comprises the following step:

coding the compiled signal with the scrambling code associated with the compiled signal.

15. A method for limiting the power of a transmission-end second signal compiled from M first signals coded with different scrambling codes, wherein each first signal is a signal compiled from a plurality of differently spread-coded signals, the method comprising:

a) forming, with a circuit, a spread-coded correction signal on the basis of correction spread codes, and b) overlaying, with a circuit, the second signal with the correction signal formed, wherein step a) comprises the following steps:

a1) forming a first provisional correction signal on the basis of the second signal;

a2) producing P second provisional correction signals from the first provisional correction signal, where $P \leq M$;

a3) respectively decoding the P second provisional correction signals with P of the M inverted scrambling codes;

a4) selecting those signal components of the P decoded second provisional correction signals which are based on the correction spread codes; and a5) forming the correction signal on the basis of the selected signal components.

16. The method according to claim 15, wherein the method is used in a W-CDMA-based base station.

17. A circuit for limiting the power of a transmission-end signal compiled from a plurality of differently spread-coded signals, the spread codes used for the differently spread-coded signals being known code engagement information, comprising:
a first means for selecting correction spread codes by evaluating the code engagement information, wherein more than one spread factor is permitted in the code engagement information,
a second means for forming a spread-coded correction signal on the basis of the selected correction spread codes, and
a third means for overlaying the compiled signal with the correction signal formed, wherein the first means also selects the correction spread codes on the basis of first power statements which are each characteristics of the power of a spread-coded signal in the compiled signal.

18. The circuit according to claim 17, wherein each of the correction spread codes has the same spread factor $SF_{corr}$.

19. The circuit according to claim 18, wherein the spread codes which are being used and the correction spread codes are OVSF spread codes.

20. The circuit according to claim 17, wherein the first means comprises a means for determining second power statements which are each characteristic of the power of a signal component of the compiled signal which is associated with a spread code with the spread factor.

21. A circuit for limiting the power of a transmission-end signal compiled from a plurality of differently spread-coded signals in a W-CDMA radio device, said signal being coded with a scrambling code, comprising:
a first means for forming a spread-coded correction signal from the compiled signal on the basis of correction spread codes, wherein the First means comprises:
a means for forming a provisional correction signal on the basis of the compiled signal,
a means for decoding the provisional correction signal with the inverted scrambling code,
a means for selecting those signal components of the decoded provisional correction signal which are based on the correction spread codes, and
a means for coding the selected signal components with the scrambling code, and
a second means for overlaying the compiled signal with the correction signal formed.

22. The circuit according to claim 21, wherein the circuit is used in a W-CDMA-based base station, and the compiled signal additionally comprises the data of the synchronization channels.

23. A circuit for limiting the power of a transmission-end signal compiled from a plurality of differently spread-coded signals in a W-CDMA radio device, said signal not yet being coded with a scrambling code, comprising:
a first means for coding the compiled signal with the scrambling code associated with the compiled signal and forming a spread-coded correction signal from the scrambled compiled signal on the basis of correction spread codes, wherein the first means comprises:
a means for forming a provisional correction signal from the coded compiled signal,
a means for decoding the provisional correction signal with the inverted scrambling code,
a means for selecting those signal components of the decoded provisional correction signal which are based on the correction signal codes, and
a second means for overlaying the compiled signal with the correction signal formed.

24. A circuit for limiting the power of a transmission-end second signal compiled from M first signal coded with different scrambling codes, where each first signal is a signal coded from a plurality of differently spread-coded signals, comprising:
a first means for forming a spread-coded correction signal on the basis of correction spread codes, and
a second means for overlaying the second signal with the correction signal formed, wherein the first means comprises:
a means for forming a first provisional correction signal on the basis of the second signal,
a means for producing P second provisional correction signals from the first provisional correction signal, wherein $P \leq M$
a means for decoding the P second provisional correction signal with P of the inverted M scrambling codes,
a means for selecting those signal components of the P decoded second provisional correction signals which are based on the correction spread codes, and
a means for forming the correction signal on the basis of the selected signal components.

25. The circuit according to claim 24, wherein the circuit is used in a W-CDMA-based base station.

26. The circuit of claim 17, wherein more than one spread factor are permitted in the selected correction spread codes.

* * * * *